United States Patent
Nishizawa et al.

(10) Patent No.: US 7,830,610 B2
(45) Date of Patent: Nov. 9, 2010

(54) LENS, LENS UNIT, AND IMAGING DEVICE USING THE SAME

(75) Inventors: Hiroshi Nishizawa, Kanagawa (JP); Makoto Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/097,180

(22) PCT Filed: Dec. 5, 2006

(86) PCT No.: PCT/JP2006/324257

§ 371 (c)(1),
(2), (4) Date: Feb. 23, 2009

(87) PCT Pub. No.: WO2007/069499

PCT Pub. Date: Jun. 21, 2007

(65) Prior Publication Data

US 2009/0168204 A1  Jul. 2, 2009

(30) Foreign Application Priority Data

| Dec. 13, 2005 | (JP) | ............................ 2005-359491 |
| Dec. 13, 2005 | (JP) | ............................ 2005-359492 |
| Dec. 13, 2005 | (JP) | ............................ 2005-359493 |
| Jan. 23, 2006 | (JP) | ............................ 2006-014168 |

(51) Int. Cl.
*G02B 3/00* (2006.01)
(52) U.S. Cl. ........................ 359/642; 359/796
(58) Field of Classification Search ................ 359/642, 359/796, 811

See application file for complete search history.

(56) References Cited

U.S. PATENT DOCUMENTS

| 7,349,161 B1 * | 3/2008 | Shyu et al. .................. 359/642 |
| 2002/0030899 A1 | 3/2002 | Maeda et al. |

FOREIGN PATENT DOCUMENTS

| JP | 60-230603 | 11/1985 |
| JP | 62-11802 | 1/1987 |
| JP | 2002-71909 | 3/2002 |
| JP | 2004-29045 | 1/2004 |
| JP | 2004-205823 | 7/2004 |
| JP | 2004-341476 | 12/2004 |
| JP | 2005-62432 | 3/2005 |
| JP | 2005-157253 | 6/2005 |
| JP | 2005-201977 | 7/2005 |

* cited by examiner

*Primary Examiner*—Darryl J Collins
(74) *Attorney, Agent, or Firm*—Hamre, Schumann, Mueller & Larson, P.C.

(57) ABSTRACT

A lens is provided which is configured so that the dimensional accuracy of the lens surface can be evaluated easily and accurately, and the control of the accuracy of the lens can be easily performed. The lens comprises a lens effective part having lens surfaces formed around an optical axis as the center and an edge part in a doughnut shape as viewed in a plan view, which is extended along the outer periphery of the lens effective part. The edge part and the lens effective part are molded simultaneously, and annular indices around the optical axis as the center, with which the dimensional accuracy of the lens surfaces can be detected, are formed on both the surfaces of the edge part.

15 Claims, 21 Drawing Sheets

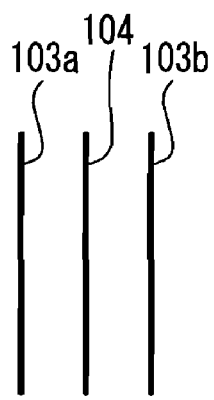 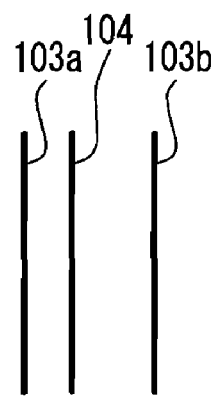 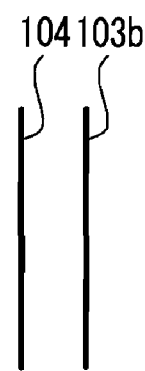 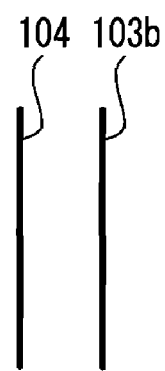
FIG. 13A　　FIG. 13B　　FIG. 13C　　FIG. 13D
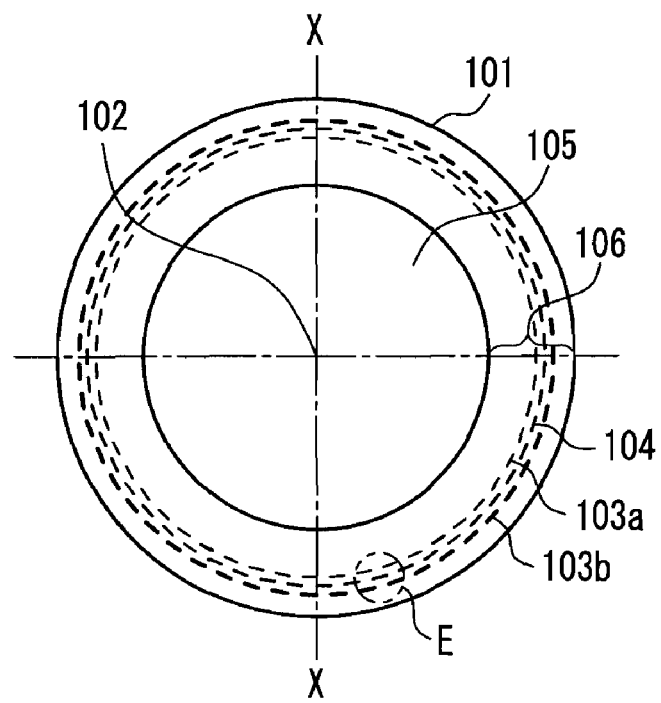
FIG. 14

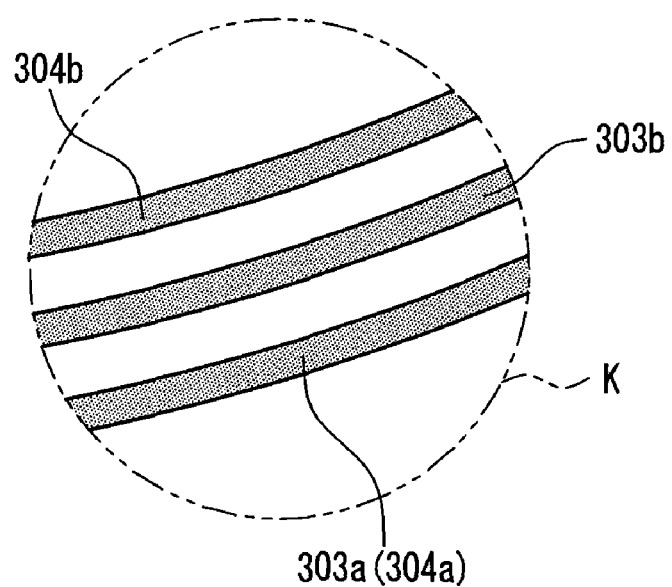
FIG. 35
   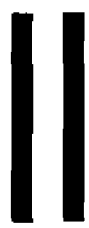
FIG. 36A  FIG. 36B  FIG. 36C  FIG. 36D

LENS, LENS UNIT, AND IMAGING DEVICE USING THE SAME

The present invention relates a lens and a lens unit for use in an imaging device incorporated in a mobile telephone with a camera, a mobile terminal, or the like, and an imaging device using the same.

BACKGROUND ART

Lenses of this kind have to be mass-produced at low cost with good accuracy by, for example, injection molding of a transparent optical resin. Besides, when used, a plurality of lenses are combined in many cases. The patent document 1 describes a configuration of an optical lens such as an objective lens in an optical pickup in which a mark is provided in an outer periphery to the lens effective radius part so as to be concentric with the lens effective radius part, which, for example, facilitates the alignment of axes of combined lenses. The document also describes a method in which a plurality of lenses are assembled by fitting projected and recessed portions on surfaces in an outer peripheral parts of lens effective radius parts, whereby the phase matching of the plurality of lenses is facilitated.

The Patent Document 2 describes a configuration of an objective lens in an optical pickup that is obtained by combining a plurality of lenses; the objective lens is configured so that a mark indicative of a die cavity used for molding the lens is provided in a lens to be positioned on the lower side, and the mark of the lens can be seen through a smooth part provided in a lens positioned on the upper side, above the lens on the lower side.

Patent Document 1: JP 2002-71909 A
Patent Document 2: JP 2004-205823 A

DISCLOSURE OF INVENTION

Problem to be Solved by the Invention

The conventional techniques as described above are applied to the case where a plurality of lenses are used in combination for forming an objective lens in an optical pickup, so as to improve the position accuracy of lenses, and to improve the workability in the assembling of the lenses. On the other hand, an imaging device used in a mobile telephone with a camera, or the like, has been downsized increasingly, and the downsizing and thinning of a lens used therein have been demanded further. Besides, as the numbers of pixels in an imaging element are increasing, the optical properties that a lens is required to have are increasingly strict. Regarding a single lens, particularly when a lens surface is aspherical, data of optical properties are measured by using an atomic force microscope (AFM) or the like, and a shape of a molded lens is measured, with respect to design data of an aspherical shape. Then, by best fitting and evaluating the same, a high-precision and high-performance lens can be realized.

Further, the shift of centers of lens surfaces on both sides of a single lens from each other (this shift is referred to as eccentricity or decentering) significantly affects the performance. Therefore, the measurement has to be carried out with meticulous attention to detail. To evaluate such measurement for each molding lot, considerably enormous efforts are needed. Further, in the case where the evaluation results based on the measured data are not satisfactory, the molding conditions or the like have to be reviewed or reset, which become factors inhibiting the improvement of productivity.

It is an object of the present invention to provide a lens, a lens unit, and an imaging device using the same, which solve the above-described conventional problems, and are configured so that the dimensional accuracy of lens surfaces can be evaluated easily and accurately, and the control of the accuracy of the lens can be performed easily.

Means for Solving Problem

A lens according to the present invention includes a lens effective part having lens surfaces formed around an optical axis as the center; and an edge part in a doughnut shape as viewed in a plan view, which is extended along an outer periphery of the lens effective part, wherein the edge part and the lens effective part are molded simultaneously, and on both surfaces of the edge part, annular indices around the optical axis as the center are formed, with which dimensional accuracies of the lens surfaces can be detected.

Effects of the Invention

With the lens of the present invention, the annular indices formed on both the surfaces of the edge part can be observed when parallel light is projected to the edge part. Therefore, by evaluating the eccentricity or the like of these annular indices, the dimensional accuracy such as eccentricity of both the lens surfaces can be evaluated easily. This allows the control of the dimensional accuracy of the lens to be implemented easily.

BRIEF DESCRIPTION OF DRAWINGS

FIGS. 13A to 13D explain the visibility of three annular grooves formed on a lens according to Embodiment 4 of the present invention.

FIG. 14 is a plan view of a lens according to Embodiment 5 of the present invention.

FIG. 35 is an enlarged view of a part K shown in FIGS. 34A and 34B.

FIGS. 36A to 36D explain the visibility of an annular angled portion formed on the lens according to Embodiment 11 of the present invention.

Figure 1A:
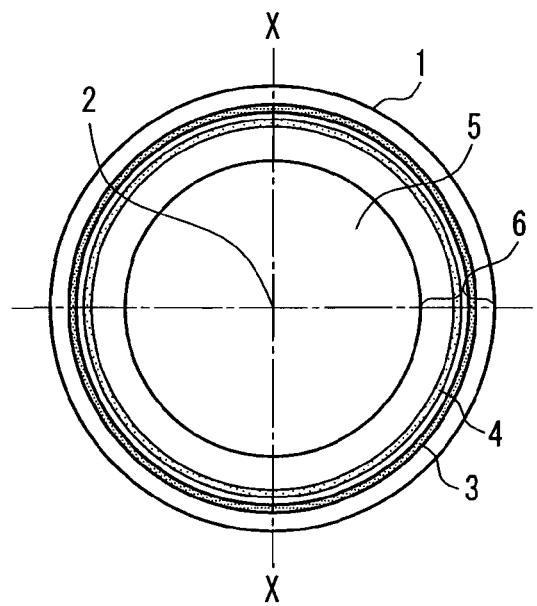
FIGS. 1A and 1B are a plan view and a cross-sectional view, respectively, for schematically illustrating a lens according to Embodiment 1 of the present invention.

DESCRIPTION OF THE REFERENCE NUMERALS 1 lens
2 optical axis
3,4 annular groove
5 lens effective part
6 edge part
20 imaging device
22 three-dimensional substrate
22a lens barrel part
22b bottom part
24 optical filter
25 semiconductor imaging element
101 lens
102 optical axis
103a, 103b, 104 annular groove
105 lens effective part
106 edge part
120 imaging device
122 three-dimensional substrate
122a lens barrel part
122b bottom part
124 optical filter
125 semiconductor imaging element
201, 201A, 201B lens
202 optical axis
203 annular groove
205 lens effective part
206 edge part
208, 208A, 208B spigot joint part
209 annular step-like part
220 imaging device
222 three-dimensional substrate
224 optical filter
225 semiconductor imaging element
227 diaphragm aperture
230 printed circuit board (FPC)
231 lens barrel
301, 301A, 301B lens
302 optical axis
303, 303a, 303b, 304a, 304b annular angled portion
304 annular band-like recessed part
305 lens effective part
306 edge part
308, 308B spigot joint part
320 imaging device
322 three-dimensional substrate
324 optical filter
325 semiconductor imaging element
327 diaphragm aperture
330 printed circuit board (FPC)
331 lens barrel
R1, R2 lens surface

DESCRIPTION OF THE INVENTION

In an embodiment of the lens of the present invention, it is preferable that as the annular indices, annular grooves are formed along circles around the optical axis as the center, each of the annular grooves being continuous or discontinuous. With this configuration, the annular lines corresponding to the annular grooves formed on both the surfaces of the edge part are observed when parallel light is projected to the edge part. Therefore, by evaluating the eccentricity or the like of these annular indices, the dimensional accuracy such as eccentricity of both the lens surfaces can be evaluated easily. This allows the control of the dimensional accuracy of the lens to be implemented easily.

Further, both the surfaces of the edge part are formed so as to be two flat surfaces parallel with each other. With this configuration, the light transmitted through the edge part does not refract or tilt, and the degradation of measurement accuracy can be prevented. Besides, irrespective of the side of the lens from which the parallel light is projected, the reproducibility of the measurement can be maintained high. Still further, it is possible to form a tolerance range on a master chart in advance using a universal projector or the like and check whether or not a projected annular groove falls in the tolerance range, so as to check and control the lens accuracy.

Preferably, each of the annular grooves is formed so as to have a V-shaped cross section having an acute end acute. With this configuration, the annular lines corresponding to the annular grooves are observed as clear-cut, sufficiently thin lines. Therefore, the lens accuracy can be measured more accurately. Besides, the visibility upon measurement is improved, whereby the workability in an accuracy-checking work is improved.

Further, it is preferable that the two annular grooves formed on both the surfaces of the edge part have different diameters, and are close to each other as viewed in a plan view. With this configuration, since the two annular lines corresponding to both the lens surfaces, respectively, are observed in a state of being close to each other, the visibility regarding the presence/absence of shift of the two, i.e., the presence/absence of eccentricity, is improved. Further, if the proximity (spacing) between the two annular grooves in a plan view is set to the same level as the required accuracy of the lens, the eccentricity of the two lens surfaces (dimensional accuracy) can be determined easily by checking whether or not the two annular grooves overlap each other at any position in the circumferential direction. In other words, without measuring the dimensions, the presence/absence of eccentricity can be determined visually.

Alternatively, it is preferable that the two annular grooves formed on both the surfaces of the edge part have the same diameter, each of the annular grooves is formed to be discontinuous in the circumferential direction, and the two discontinuous annular grooves are arranged so as to compensate each other to form a substantially continuous circle as viewed in a plan view. With this configuration, by checking whether or not a substantially continuous circle formed by the two discontinuous annular grooves compensating each other has a smooth line, the visual determination of the presence/absence of eccentricity of both of the lens surfaces can be carried out easily, an further, it is possible to determine easily the position in the circumferential direction where the eccentricity occurs (and the magnitude thereof).

In an embodiment of the lens of the present invention, preferably, as the annular indices, two annular grooves in a form of concentric circles close to each other around the optical axis as the center are formed on a first surface among the first surface and a second surface that constitute both the surfaces of the edge part, respectively, while one annular groove around the optical axis as the center is formed on the second surface so as to be positioned between the two annular grooves formed close to each other on the first surface, as viewed in a plan view. With this configuration, when parallel light is projected to the edge part, annular lines (circles) corresponding to the annular grooves formed on both surfaces of the edge part can be observed. In addition, it is possible to observe a state in which one annular line corresponding to one annular groove formed on the second surface is arranged between two annular lines corresponding to two annular grooves formed close to each other on the first surface. In other words, the three annular lines are arranged like the meter display calibration markings interposed between symmetrical lines, a difference between respective spacings between the two annular lines and the one annular line positioned therebetween can be viewed easily. Therefore, if the two annular lines and the one annular line positioned therebetween shift with respect to each other owing to eccentricity or the like of the lens surfaces, this shift can be viewed easily. This allows the control of the dimensional accuracy of the lens to be implemented easily.

Further, both the surfaces of the edge part are formed so as to be two flat surfaces parallel with each other. With this configuration, the light transmitted through the edge part does not refract or tilt, and the degradation of measurement accuracy can be prevented. Besides, irrespective of the side of the lens from which the parallel light is projected, the reproducibility of the measurement can be kept high. Still further, it is possible to form a tolerance range on a master chart in advance using a universal projector of the like and check whether or not a projected annular groove falls in the tolerance range, so as to check and control the lens accuracy.

Still further, preferably, each of the annular grooves is formed so as to have a V-shaped cross section having an acute end. With this configuration, the annular lines corresponding to the annular grooves are observed as clear-cut, sufficiently thin lines. Therefore, the lens accuracy can be measured more accurately. Besides, the visibility upon measurement is improved, whereby the workability in an accuracy-checking operation is improved.

Still further, it is preferable that the two annular grooves formed on the first surface are divided into a plurality of segments along the respective circumferential directions at the same angular pitches and phases, the one annular groove formed on the second surface is divided also into a plurality of segments in the circumferential direction, and the segments of the two annular grooves formed on the first surface and the segments of the one annular groove formed on the second surface are arranged alternately in the circumferential direction, as viewed in a plan view. With this configuration, the segments of the two annular grooves formed on the first surface and the segments of the one annular groove formed on the second surface are arranged like calibration markings of a main scale and vernier scales composing a so-called vernier caliper, whereby eccentricity at a certain position in the circumferential direction can be viewed easily. As a result, the position in the circumferential direction where eccentricity occurs can be determined easily, and the measurement and evaluation is made easier.

Still further, in an embodiment of the lens of the present invention, it is preferable that as the annular indices, an annular step-like part is provided around the optical axis as the center on a first surface among the first surface and a second surface that constitute both the surfaces of the edge part, respectively, while an annular groove is provided on the second surface around the optical axis as the center, wherein the annular step-like part and the annular groove are molded integrally and simultaneously with the lens effective part and the edge part, and are close to each other as viewed in a plan view.

Still further, in another configuration of the lens of the present invention, it is preferable that as the annular indices, a spigot joint part (a spigot-joint-like fitting part) in an annular shape is provided around the optical axis as the center so as to be projected from a first surface among the first surface and a second surface that constitute both the surfaces of the edge part, respectively, while an annular groove is provided on the second surface around the optical axis as the center, wherein the spigot joint part and the annular groove are molded simultaneously and integrally with the lens effective part and the edge part, and the annular groove is close to a circle corresponding to either an inner circumferential wall or an outer circumferential wall of the spigot joint part, as viewed in a plan view.

By so doing, when parallel light is projected to the edge part, circles can be observed, the circles being a circle (annular line) corresponding to the inner circumferential wall or the outer circumferential wall of the annular step-like part or the spigot joint part formed on the first surface of the edge part, and a circle (annular line) corresponding to the annular groove formed on the second surface of the edge part. By evaluating eccentricity and the like of these annular lines, the dimensional accuracy such as the eccentricity of both the lens surfaces can be evaluated easily. This allows the control of the dimensional accuracy of the lens to be implemented easily.

Further, the annular step-like part is formed around the optical axis as the center in the vicinity of either the inner circumferential wall or the outer circumferential wall of the spigot joint part, so that the annular groove is positioned between either the inner circumferential wall or the outer circumferential wall of the spigot joint part and the annular step-like part, as viewed in a plan view. With this configuration, a circle corresponding to the annular groove formed on the second surface is observed between a circle corresponding to the inner circumferential wall or the outer circumferential wall of the spigot joint part and a circle corresponding to the step-like part on the first surface of the edge part, as viewed in a plan view. Therefore, if the two circles and the one circle positioned between the foregoing two shift with respect to each other owing to eccentricity or the like of both the lens surfaces, this shift can be viewed easily.

Further, a lens unit of the present invention is a lens unit obtained by coupling two lenses having a configuration as described above in the optical axis direction, the two lenses being a first lens and a second lens, wherein the two lenses are coupled in a manner such that an inner circumferential wall of the spigot joint part of the first lens is fitted around an outer circumferential wall of the spigot joint part of the second lens. With this configuration, it is possible to achieve an effect of improving the optical accuracy of the combined lens, in addition to an effect of easily controlling the dimensional accuracy of each of the lenses composing the lens unit as described above. More specifically, in the case where the two lenses are fixed independently in the lens barrel, the fixing accuracy of each lens in the lens barrel becomes a factor that would degrade the optical accuracy, such as an optical axis misalignment or tilt of the lenses; however, in the case where two lenses are coupled directly with each other so as to form a lens unit, such a factor does not arise.

Further, in an embodiment of the lens of the present invention, it is preferable that, as the annular indices, angled portions are formed on both the surfaces of the edge part, the angled portions being annular around the optical axis as the center as viewed in a plan view, and the angled portions are molded integrally and simultaneously with the lens effective part and the edge part. By so doing, when parallel light is projected to the edge part, a plurality of annular lines corresponding to the annular angled portions can be observed, the angled portions being formed on both the surfaces of the edge part so as to be annular around the optical axis as the center as viewed in a plan view. In the case where the accuracy of the lens surfaces degrades owing to various conditions upon the molding of the lens, such as the pressure, the temperature, and the time, the annular angled portions formed on the edge part also reflects the factors of the degradation. Therefore, by evaluating eccentricity and the like of the plurality of the annular lines corresponding to the annular angled portions, the dimensional accuracy such as the eccentricity of both the lens surfaces can be evaluated easily. This allows the control of the dimensional accuracy of the lens to be implemented easily.

Still further, the annular angled portions are formed at positions of substantially equal radii with respect to the optical axis as the center on both the surfaces of the edge part. With this configuration, if the annular lines corresponding to the annular angled portions formed on both the surfaces of the edge part overlap, thereby being observed as one circle, it can be estimated that no eccentricity occurs between the two surfaces, whereby high accuracy is achieved. In other words, the presence/absence of eccentricity can be determined visually without the measurement of dimensions such as roundness degrees.

Still further, in another preferable embodiment of the lens of the present invention, a recessed part is formed on at least one of the surfaces of the edge part, the recessed part being in an annular band-like form as viewed in a plan view, and a corner formed by a bottom face and a side face of the recessed part is equivalent to the angled portion. With this configuration, by forming the recessed part in an annular band-like form as viewed in a plan view, two angled portions in a form of concentric circles can be obtained, and the visual evaluation of the eccentricity between the two surfaces or the like is facilitated by using the positional relationship between the foregoing two angled portions and the annular angled portion formed on the opposite surface.

In still another preferable embodiment of the lens of the present invention, a projected part is formed on at least one of the surfaces of the edge part, the projected part being in an annular band-like form as viewed in a plan view, and a corner formed by a side face of the projected part and the surface of the edge part is equivalent to the angled portion. With this configuration, by forming the projected part in an annular band-like form as viewed in a plan view, two angled portions in a form of concentric circles can be obtained, and the visual evaluation of the eccentricity between the two surfaces or the like is facilitated by using the positional relationship between the foregoing two angled portions and the annular angled portion formed on the opposite surface.

In still another preferable embodiment of the lens of the present invention, a top face of the projected part is projected in the optical axis direction, beyond the lens surface. With this configuration, for example, when the lens is placed on a flat-face table, by placing the lens with its projected part side down, it is possible to avoid the lens surface becoming in direct contact with the table. Therefore, this configuration is preferred so as to prevent the lens surface from being marred, or to protect the lens surface.

In still another preferable embodiment of the lens of the present invention, a recessed part that is in an annular band-like form as viewed in a plan view is formed in the vicinity of the projected part in the annular band-like form as viewed in a plan view. With this configuration, when an adhesive is applied over an outer circumferential surface of the edge part of the lens so that when the fixing of the lens with another lens or with the lens barrel is carried out, the recessed part in an annular band-like form as viewed in a plan view functions as a reservoir for excess adhesive. Besides, the projected part functions as a dam for preventing the adhesive from intruding toward the inside (the lens effective part). This configuration stabilizes the quality of a lens assembly, and improves the yield.

Still further, an imaging device of the present invention includes the above-described lens or the lens unit having the above-described configuration; and a semiconductor imaging element that outputs electric signals of an image formed by receiving light focused by the lens or the lens unit. This makes it possible to realize a downsized and inexpensive imaging device having excellent optical properties by using a lens or a lens unit with high dimensional accuracy.

The following describes embodiments of the present invention while referring to the drawings.

Embodiment 1

Figure 1B:
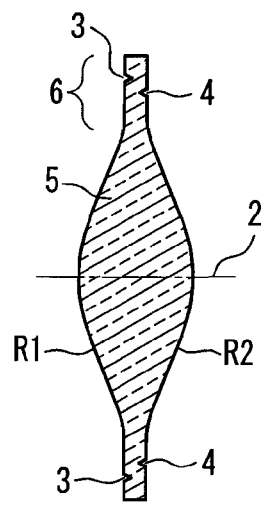

FIGS. 1A and 1B schematically illustrate a lens according to Embodiment 1 of the present invention. FIG. 1A is a plan view of the lens as viewed in an optical axis direction, and FIG. 1B is a cross-sectional view of the lens shown in FIG. 1A, taken along the line X-X.

As shown in FIGS. 1A and 1B, the lens 1 according to the present embodiment includes a lens effective part 5 in a biconvex lens shape around an optical axis 2 of the lens 1, and an edge part 6 in a doughnut shape as viewed in a plan view, which extends along the outer periphery of the lens effective part 5. The edge part 6 and the lens effective part 5 are molded integrally and simultaneously with a resin. As a material of the resin, "ZEONEX" (registered trademark) E48R manufactured by ZEON Corporation, for example, can be used. To obtain the required optical properties, the lens effective part 5 is designed so as to become an aspherical lens having an aspherical shape axisymmetric with respect to the optical axis 2. The refractive index, transmittance, and other properties of the material are selected appropriately according to the required optical properties of the lens 1.

It should be noted that though in the present embodiment the lens 1 is produced by resin molding, it is possible to apply the present invention to a lens produced by glass molding using optical glass, or a hybrid-type lens obtained by forming a resin layer on a spherical glass. Further, on at least a surface of the lens effective part 5, about one to four thin films of magnesium fluoride ($MgF_2$), silicon dioxide ($SiO_2$), etc., having different refractive indices, respectively, are formed by vapor deposition as an anti-reflection (AR) coating for preventing reflection.

In a lens barrel part in an imaging device according to Embodiment 3, which will be described later, one or a plurality of lenses 1 are incorporated, whereby a predetermined image forming optical system is formed. In other words, an image forming system is configured so that light incident on the lens effective part 5 is focused on a predetermined position (on a light-receiving surface of a solid-state imaging element). Here, the edge part 6 of the lens 1 has a function of positioning and fixing the lens 1 with respect to the lens barrel. Both surfaces of the edge part 6 (surfaces perpendicular to the optical axis) are formed so as to be two smooth and flat surfaces parallel with each other.

On both the surfaces of the edge part 6, grooves (hereinafter referred to as annular grooves) 3 and 4, each of which is along a circle around the optical axis 2 as the center and has a V-shaped cross section, are formed as annular indices around the optical axis 2 as the center, with which the dimensional accuracy of the surfaces of the lens 1 can be detected. These annular grooves 3 and 4 are formed simultaneously when the lens 1 (the lens effective part 5 and the edge part 6) are formed by resin molding. In the lens 1 of the present embodiment, the annular groove 4 formed on one surface of the edge part 6 has a radius slightly smaller than the radius of the annular groove 3 formed on the other surface. With this configuration, the two annular grooves 3 and 4 appear close to each other in the plan view, as shown in FIG. 1A. These annular grooves 3 and 4 have a function of facilitating the checking of the eccentricity and the like of the lens surfaces of the lens 1. Before the function is described, the resin molding of the lens 1 is described below.

The lens 1 is molded in the same process as the injection molding used for producing a usual resin product, whereas a higher dimensional accuracy is required as compared with the usual resin product, and it is necessary to reduce the contamination with dust or the like as much as possible. Therefore, the molding machine is placed in an air-conditioned clean room, and the temperature control of the molding machine is performed accurately. For example, it is necessary to maintain the cleanness class to about 10,000. It is known that in the resin molding, the size and the like subtly vary with the molding pressure, the injection rate, the holding time, the die temperature, the ambient temperature, etc., and hence, it is necessary to monitor the dimensional accuracy of the molded lens 1.

In evaluating the accuracy of the molded lens, in the case of an aspherical lens, it is necessary to perform shape measurement using the above-described AFM (e.g. UA3P manufactured by Matsushita Electric Industrial Co., Ltd.). This measurement is a complicated operation carried out for each molding lot, or at the timings of the start, midpoint, end, or the like for a molding lot. The two annular grooves 3 and 4 formed on both the surfaces of the edge part 6 are intended to facilitate such a measuring work. Since the lens effective part 5 and the edge part 6 of the lens 1 are molded simultaneously, the various kinds of factors that are considered to degrade the accuracy in the molding of the lens 1 (lens effective part 5) also affect the edge part 6. Then, by observing the annular grooves 3 and 4 formed on the edge part 6, the eccentricity of each aspheric surface (each face eccentricity) that degrades the resolution of the lens 1 (lens effective part 5), for example, can be evaluated.

The shape of the lens 1 according to the present embodiment is described below. In FIG. 1B, among the lens surfaces forming the lens effective part 5, the lens surface on the left is denoted as R1, while the lens surface on the right is denoted as R2. In one example, the surface R1 has a diameter of Φ1.5 mm around the optical axis 2 as the center, while the surface R2 has a diameter of Φ1.4 mm around the optical axis 2 as the center. The annular groove 3 has a diameter of Φ2.51 mm, while the annular groove 4 has a diameter of Φ2.50 mm. The edge part 6 has an outer diameter of Φ4.2 mm, and a thickness of about 0.8 mm.

Figure 2A:
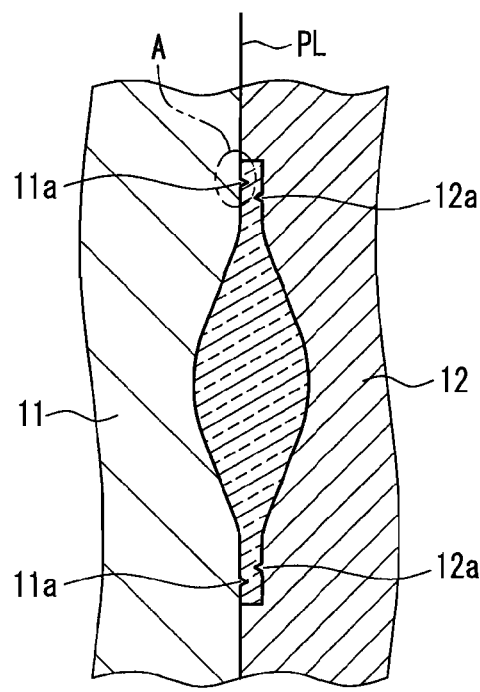
FIG. 2A conceptually illustrates a partial cross section of a die and the lens shown in FIG. 1A when the lens is formed by injection molding.
Figure 2B:
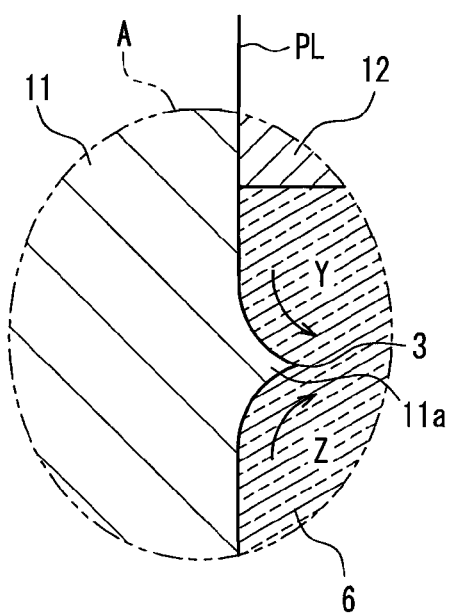
FIG. 2B is an enlarged view of a part of FIG. 2A.

Next, the annular grooves 3 and 4 formed in the edge part 6 are described below in detail, with reference to FIGS. 2A and 2B. FIG. 2A conceptually illustrates a partial cross section of a die and the lens shown in FIGS. 1A and 1B when the lens is formed by injection molding. FIG. 2B is an enlarged view of the part A shown in FIG. 2A. The die is made of tool steel, and is attached to a die set of an injection molding machine. As to the die for a lens, a block referred to as an insert part is machined separately, and incorporated into a base. The insert part is produced by machining ultrahigh-strength steel or tool steel into a rough shape, and then plating surfaces of the same with a material having a high hardness such as Ni. The plated portions are further subjected to precision machining using a precision lathe or the like.

In FIGS. 2A and 2B, PL indicates a parting line (parting plane) of the die. On a die 11 on the left, a recessed surface is formed for molding the surface R1 of the lens effective part 5. On a die 12 on the right, a recessed surface is formed for molding the surface R2 of the lens effective part 5, and around the recessed surface, a step-like recess is formed for forming the edge part 6. Resin injected through a gate (not shown) is filled in a space enclosed by the left die 11 and the right die 12, whereby the molding is performed. Annular projected portions 11a and 12a corresponding to the annular grooves 3 and 4, respectively, are formed on flat surface parts of the left and right dies 11 and 12, which correspond to the two parallel flat surfaces of the edge part 6, respectively.

FIG. 2B shows an enlarged cross-sectional shape of the annular projected portion 11a. More specifically, the annular projected portion 11a, which projects rightward from a plane of the left die 11 corresponding to the parting line, has an approximately triangular cross section with an acute end. In one example, the approximately triangular cross section has a base (length of a bottom) of about 30 μm, and a height of about 8 μm. In FIG. 2B, the annular projected portion 11a is drawn with its height being exaggerated. The shape of the annular projected portion 11a having the approximately triangular cross section with an acute end is transferred to the edge part 6 of the lens 1, whereby the annular groove 3 having a V-letter-shaped cross section having an acute end is formed. It should be noted that in the case where the lens is molded with glass, a material in a ball shape or a disk shape is placed in a die and is softened by high-temperature heating, whereby a required shape is transferred. The basic concepts in this case are identical to those in the case of resin molding, though being different in the steps and the die configuration.

Figure 3:
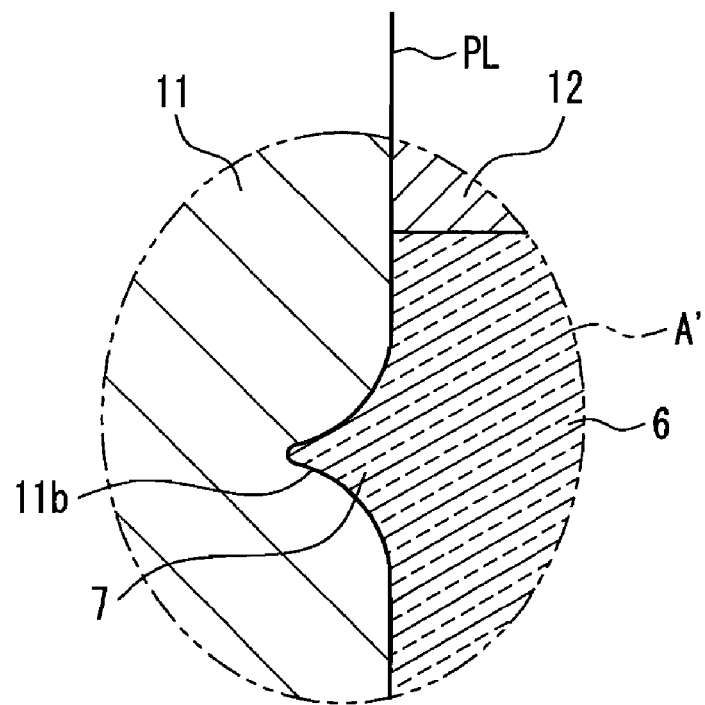
FIG. 3 is a drawing corresponding to FIG. 2B on the assumption that an annular projected portion is formed in the edge part of the lens, instead of the annular groove.

FIG. 3 is a drawing corresponding to FIG. 2B on the assumption that an annular projected portion (denoted with A) is formed in the edge part of the lens, instead of the annular groove. The basic function of the annular grooves 3 and 4 is to facilitate the checking of the dimensional accuracy of the molded lens 1, as described above. In view of this function, it is considered to be feasible to form annular projected portions on both surfaces of the edge part 6 of the lens 1, in place of the annular grooves 3 and 4.

However, as shown in FIG. 3, in the case where the annular projected portion 7 is formed on the edge part 6, it is impossible to allow the annular projected portion 7 to have a shape with an acute end. In order to allow the annular projected portion 7 to have a shape with an acute end, it is necessary to form a V-shaped groove in the corresponding die 11, but it is difficult to machine the end (bottom) into an acute shape. This is because a tip of a cutting tool used for machining the die unavoidably has a rounded shape having a certain radius (curved shape), as shown in FIG. 4.

Figure 4:
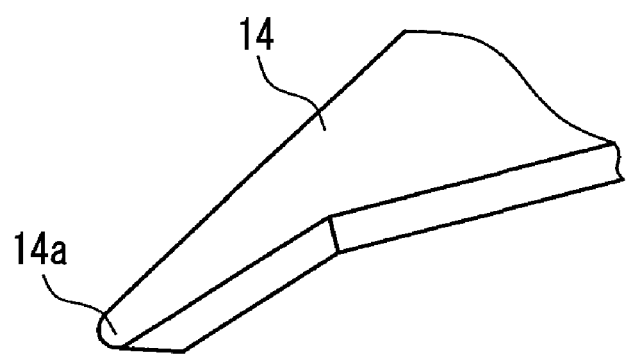
FIG. 4 is a perspective view illustrating a shape of a tip part of a cutting tool for machining the die.

FIG. 4 is a perspective view illustrating a shape of a tip part of a cutting tool for machining the die. This cutting tool 14 is a diamond bite having diamond attached to a tip 14a thereof. In one example, the radius of the tip (radius of curvature) of the cutting tool 14 is about 2.3 μm. Therefore, as shown in FIG. 3, the end of the V-shaped groove 11b formed in the die 11 has a rounded shape having a radius of about 2.3 μm, and the end of the annular projected portion 7 of the edge part 6, to which the foregoing shape is transferred, also has a rounded shape having a radius of about 2.3 μm. In the case where the dimensional accuracy of the lens 1 is measured using the annular projected portion 7 in such a shape having a rounded end, it is difficult to improve the measurement accuracy.

In contrast, in the lens 1 of the present embodiment, the annular projected portions 11a and 12a, which are formed on the dies 11 and 12 so that annular grooves 3 and 4 are formed in the edge part 6, are allowed to have the shapes having sufficiently acute ends. In other words, even if the cutting tool having a tip 14a in a round shape as shown in FIG. 4 is used, the machining may be performed by causing the tool to trim slanting surfaces of the annular projected portions 11a and 12a from the outer radius side and from the inner radius side of the die in the directions as shown by arrow lines Y and Z in FIG. 2B, whereby the annular projected portions 11a and 12a are allowed to have shapes having acute ends. As a result, the cross section of each of the annular grooves 3 and 4 formed on the edge part 6 of the molded lens 1 is made to have a V-letter shape having an acute end, whereby the measurement of the dimensional accuracy of the lens 1 with use of the annular grooves 3 and 4 can be performed with good accuracy. In the manufacture of dies, portions corresponding to the annular grooves 3 and 4 are machined simultaneously when portions corresponding to the effective part 5 of the lens 1 are machined, so that the dimensional accuracy between the foregoing two is improved.

Next, the method for measuring each face eccentricity of the lens 1 with use of the annular grooves 3 and 4 is described below. First, the lens 1 is set on a microscope or the like, and parallel light is projected in the direction along the optical axis 2 of the lens 1. Then, annular lines are observed, which are formed by the annular grooves 3 and 4 formed on the edge part 6. As described above, since the annular grooves 3 and 4 have a V-shaped cross section having an acute end, the annular lines are observed as clear-cut thin lines. Besides, since both the surfaces of the edge part 6 are flat and smooth surfaces parallel with each other, only slight refraction or scattering occurs with the incident parallel light. Therefore, it is possible to observe the annular lines corresponding to the annular grooves 3 and 4 with good accuracy.

Further, since a microscope has a small depth of field, it is necessary to pick up two images at different positions in the optical axis direction and synthesize the two images, in order to observe the two annular lines corresponding to the annular grooves 3 and 4 at the same time. As a microscopic system capable of performing such processing, for example, a metallurgical microscope high-depth-of-field image analysis system DF-2 produced by Olympus Corporation is well known. Alternatively, a confocal scanning microscope may be used. A method of observing the lines with the use of a projector or the like may be applicable as a simpler observing method. Besides, it is desirable that light having an appropriate wavelength according to the visibility of the annular grooves 3 and 4 be used as light to be transmitted through the lens 1.

In the case of the lens 1 of the present embodiment, when the annular grooves 3 and 4 formed on both the surfaces of the edge part 6 respectively are observed by a microscope, they are observed as two concentric circles close to each other as shown in FIG. 1A. Since the annular groove 3 formed on one surface of the edge part 6 and the surface R1 of the lens are molded simultaneously in the die 11, the annular groove 3 is closely associated with the dimensional accuracy of the surface R1. Likewise, since the annular groove 4 formed on the other surface of the edge part 6 and the surface R2 of the lens are molded simultaneously in the die 12, the annular groove 4 is closely associated with the dimensional accuracy of the surface R2. Therefore, if the two circles corresponding to the two annular grooves 3 and 4, respectively, are observed like concentric circles at constant spacings at certain positions in the circumferential direction, it is assumed that the respective dimensional accuracies of the lens surfaces R1 and R2 are excellent.

As described above, in the lens 1 of the present embodiment, the diameters of the annular grooves 3 and 4 are Φ2.50 mm, and Φ2.51 mm respectively, which means that a difference of 10 μm is given thereto. If the center of the surface R1 is decentered by 2 μm in a certain direction and the center of the surface R2 shifts by 3 μm in the opposite direction, the two circles corresponding to the annular grooves 3 and 4 are observed as overlapping partially. If the eccentricity is 5 μm or greater, it is possible to detect the eccentricity without failure. The lens 1 of the present embodiment is designed so as to have an eccentricity tolerance of 10 μm, and if there is an eccentricity greater than the foregoing eccentricity tolerance, the eccentricity can be detected sufficiently by observing the annular grooves 3 and 4.

If an even greater eccentricity occurs, the two circles corresponding to the annular grooves 3 and 4 are observed as overlapping at two positions. In the case where such a greater eccentricity is tolerable in view of the lens design, the difference between the diameters of the two annular grooves 3 and 4 may be set to a greater value. For example, by setting the difference between the diameters of the two annular grooves 3 and 4 to twice the eccentricity tolerance, the evaluation of the eccentricity between the two lens surfaces R1 and R2 can be performed with good accuracy. In contrast, if the eccentricity tolerance is small, the difference between the diameters of the annular grooves 3 and 4 may be set to a smaller value.

Alternatively, by measuring the respective degrees of roundness of the annular grooves 3 and 4, the dimensional accuracy of the lens surfaces R1 and R2 can be estimated. In this case, charts of perfect circles are prepared in a projector or the like in advance, and differences of projected images of the annular grooves 3 and 4 from the charts may be observed; by so doing, a simple evaluation is enabled. If ranges of roundness tolerances are shown in the charts, the evaluation is made further easier. Preferably, the correlation between the roundness degrees of the annular grooves 3 and 4 and the optical properties of the lens is evaluated in advance. The lenses 1 of the present embodiment were produced under various molding conditions, and optical properties of the lenses were evaluated. Consequently, it was confirmed from the experimental design that if the eccentricity fell in the range of eccentricity tolerance, even without the evaluation of the roundness, the other required shape accuracy and the like could be achieved sufficiently. Therefore, by evaluating the eccentricity of the annular grooves 3 and 4, the dimensional accuracy in relation to the required optical properties of the lens 1 can be ensured.

Embodiment 2

Figure 5A:
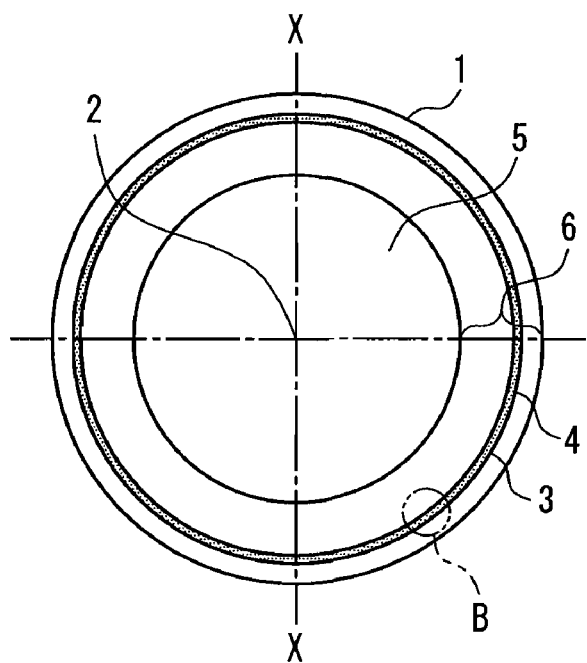
FIGS. 5A and 5B are a plan view and a cross-sectional view, respectively, for schematically illustrating a lens according to Embodiment 2 of the present invention.
Figure 5B:
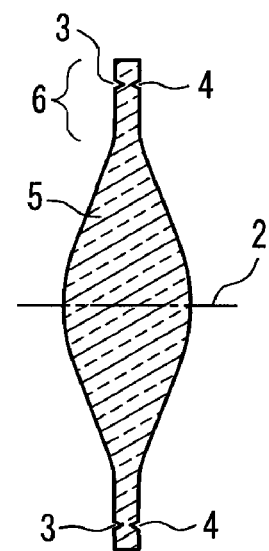
Figure 6:
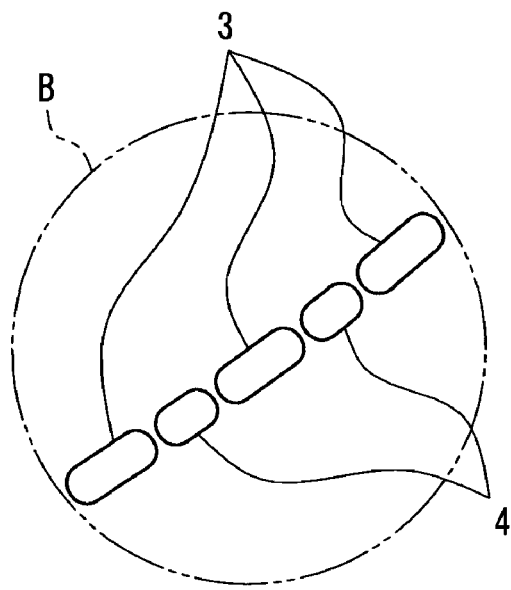
FIG. 6 is an enlarged view of a part B shown in FIG. 5A.

Next, a lens according to Embodiment 2 of the present invention is described below, with reference to FIGS. 5A, 5B, and 6. FIG. 5A is a plan view of the lens according to Embodiment 2 of the present invention, as viewed in the optical axis direction. FIG. 5B is a cross-sectional view of the lens shown in FIG. 5A, taken along the line X-X. FIG. 6 is an enlarged view of the part B shown in FIG. 5A.

The fundamental principles for the lens 1 according to the present embodiment regarding the shape, the material, the molding method, etc. are identical to those of the lens according to Embodiment 1. The difference of the lens 1 of the present embodiment from the lens of Embodiment 1 is as follows: the annular grooves 3 and 4 formed on both sides of the edge part 6, having the same diameter, are formed discontinuously in the circumferential direction, and are arranged so that the two discontinuous annular grooves 3 and 4 complement each other to form a substantially continuous circle as viewed in a plan view.

As clear from the enlarged view of FIG. 6, both of the annular grooves 3 and 4 are formed discontinuously, like broken lines, in the circumferential direction, and are positioned on the same circle. Then, the discontinuous annular grooves 3 and 4 compensate each other so as to form a substantially continuous circle. This state is obtained in the case where the lens surfaces R1 and R2 do not have eccentricity. With eccentricity, which causes the annular grooves 3 and 4 to shift from each other, a clear-cut circle as viewed in a plan view cannot be obtained. Therefore, by observing the annular grooves 3 and 4 in a plan view, the presence/absence of eccentricity of the lens surfaces R1 and R2, and the magnitude of the same, can be seen.

It is not necessarily required that the circle formed by the annular grooves 3 and 4 is completely continuous as viewed in a plan view in the non-eccentric state. The annular grooves 3 and 4 may be formed so that interstices are formed between segments of the annular groove 3 and segments of the annular groove 4. To the contrary, the annular grooves 3 and 4 may be formed so that the segments of the annular groove 3 and the segments of the annular groove 4 overlap partially. Alternatively, in order that the annular grooves 3 and 4 can be distinguished from each other easily, the lengths of the segments may be different between the annular grooves 3 and 4, or the types of the lines thereof may be different, like one is a dotted line while the other is an alternate long and short dashed line. In the example shown in FIG. 6, both of the annular grooves 3 and 4 are broken lines, formed so that each segment of the annular groove 3 has a length greater than the length of each segment of the annular groove 4.

As one of methods for dividing the annular grooves 3 and 4 into segments in the circumferential direction, like broken lines, a method is available in which acute shapes on a die, corresponding to the ends of the annular grooves 3 and 4, are rounded intermittently in the circumferential direction by etching or electrical discharge machining so that the lines are blurred (made invisible) intermittently. Another method also is available in which annular projected portions of a die, corresponding to the annular grooves 3 and 4, are removed intermittently in the circumferential direction.

In FIG. 6, the annular grooves 3 and 4 are connected smoothly so as to form a substantially continuous circle; if a shift at a level of a line width or greater occurs to the foregoing two, it can be deduced easily that eccentricity has occurred to the lens surfaces R1 and R2. As described above, if the eccentricity is about half or more of the difference between the diameter of the annular groove 3 and the diameter of the annular groove 4 in the case of the lens of Embodiment 1, the eccentricity is determined visually. In the case of the lens of the present embodiment, a further smaller eccentricity can be determined visually. This is because it is easier to determine visually whether or not the annular grooves 3 and 4 are connected smoothly to form one circle, and a higher accuracy of visibility can be achieved. Further, in the case where the respective degrees of roundness of the lens surfaces R1 and R2 deviate in different directions, it is relatively easy to determine visually the position in the circumferential direction where the degrees of roundness deviate.

It should be noted that also feasible is an embodiment such that one or both of the annular grooves 3 and 4 are formed discontinuously in the circumferential direction like broken lines, in a state in which the annular grooves 3 and 4 have slightly different diameters as in Embodiment 1.

Embodiment 3

Figure 7:
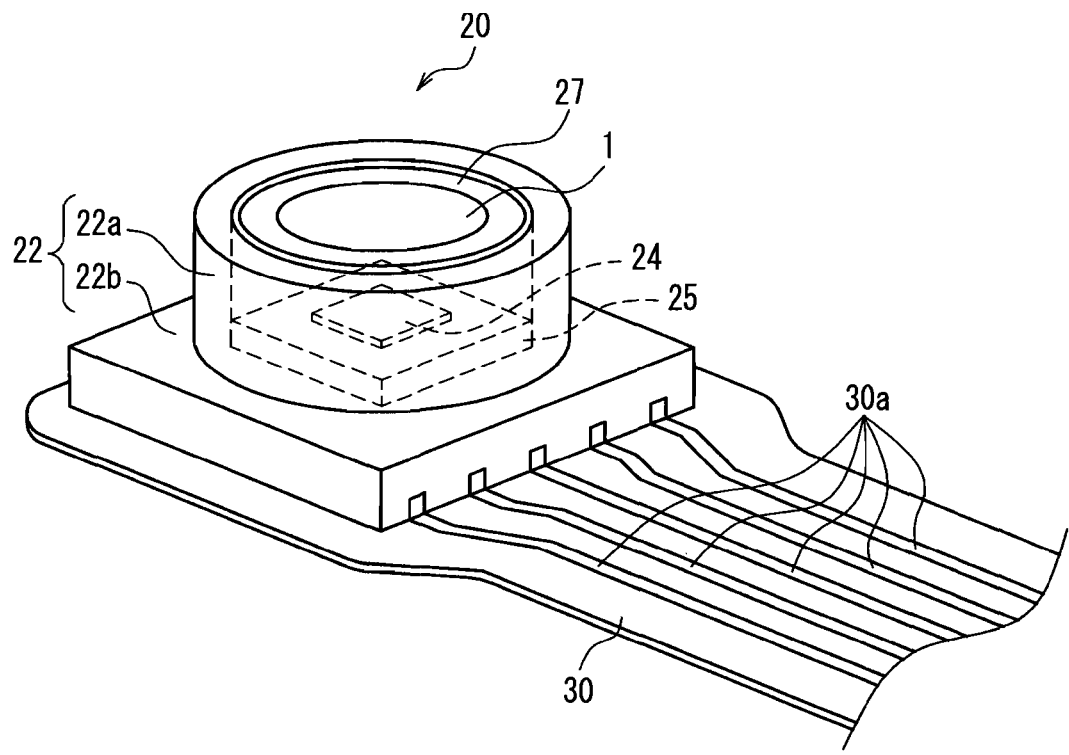
FIG. 7 is a perspective view of an imaging device according to Embodiment 3 of the present invention.
Figure 8:
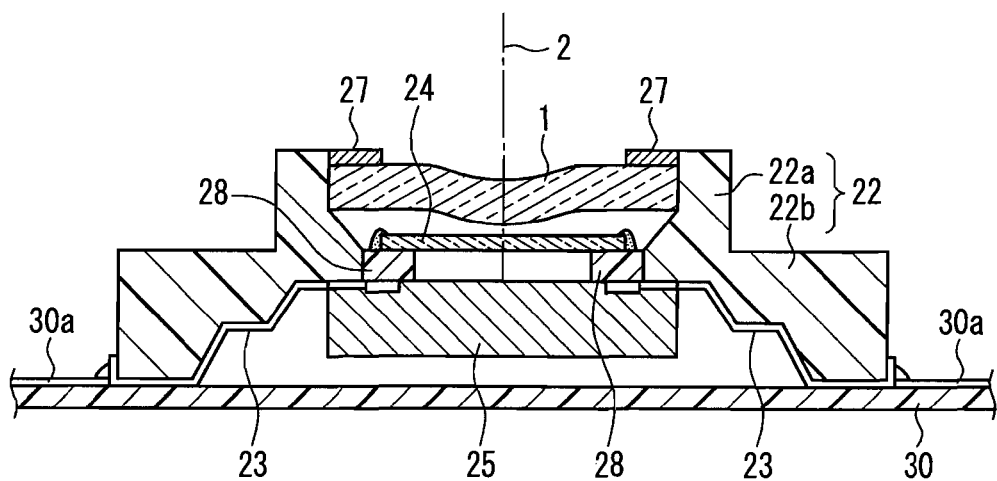
FIG. 8 is a cross-sectional view of the imaging device shown in FIG. 7, viewed from a side.

Next, an example of an imaging device in which the lens according to Embodiment 1 or 2 is used is described below, as Embodiment 3 of the present invention. FIG. 7 is a perspective view of an imaging device in which the lens according to Embodiment 1 or 2 of the present invention is used. This imaging device 20 is a camera module for use in a mobile telephone. FIG. 8 is a cross-sectional view of the imaging device shown in FIG. 7, viewed from a side.

The imaging device 20 includes a lens 1 having an optical axis 2, an optical filter 24, a semiconductor imaging element 25, a three-dimensional substrate 22 for holding these, and a flexible printed circuit board (FPC) 30 that is connected with the three-dimensional substrate 22 to transmit/receive signals to/from the outside. The three-dimensional substrate 22 serves also as a holding member for holding the semiconductor imaging element 25 and the optical filter 24. The three-dimensional substrate 22 has a cylindrical lens barrel part 22a and a bottom part 22b extending from an end side of the lens barrel part 22a outward.

The lens 1 is fixed in a manner such that the lens 1 is fitted in an inner circumferential surface of the lens barrel part 22a of the three-dimensional substrate 22. It should be noted that though the lens 1, whose cross section is shown in FIG. 8, is a concavo-convex lens, a biconvex lens of Embodiment 1 or 2 as shown in the drawings may be used instead, or alternatively, a planoconvex lens may be used instead. Further, though the cross-sectional view of FIG. 8 shows only one lens, a plurality of lenses are installed actually in many cases. For example, two lenses are used in combination so as to configure a deep-focus optical system capable of focusing a subject at a certain distance (e.g. 30 cm) or farther. On the lens 1, a diaphragm 27 for fixing the lens 1 while achieving a predetermined aperture is attached.

The semiconductor imaging element 25 placed below the lens 1 is, for example, a ¼-inch CCD having about 1,300,000 pixels and a pixel size of about 2.8 μm. The semiconductor imaging element 25 is connected electrically with a conductive pattern 23 formed on a surface of the three-dimensional substrate 22 by stud bump bonding (SBB). The conductive pattern 23 has lead lines drawn to a side face of the bottom part 22b of the three-dimensional substrate 22, which are connected with a conductive pattern 30a of the FPC 30 by soldering. The optical filter 24, placed on the semiconductor imaging element 25 via spacers 28, serves for suppressing the transmission of light other than light in the visible light range.

Light from a subject is focused by the lens 1, and is incident on the semiconductor imaging element 25 via the optical filter 24. The semiconductor imaging element 25 outputs an electric signal according to the incident light, and the electric signals are taken out via the conductive patterns 23 and 30a to the outside. With the lens 1 of the present invention, as described above, the accuracy such that eccentricity is not more than 5 μm can be ensured easily, whereby the stability of quality and the reduction of the number of controlling steps can be achieved. This makes it possible to prevent the resolution from decreasing due to field curvature and the like in peripheral portions of the light-receiving surface of the semiconductor imaging element 25. Further, when this imaging device 20 is used in a mobile telephone with a camera function, an excellent image quality can be obtained in a range from the central part to the peripheral part of an image picked up, which contributes to the increase in the added value of the mobile telephone.

Embodiment 4

Figure 9A:
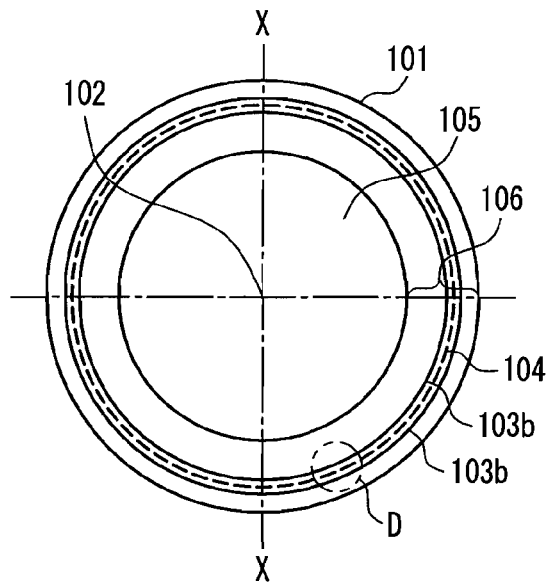
FIGS. 9A and 9B are a plan view and a cross-sectional view, respectively, for schematically illustrating a lens according to Embodiment 4 of the present invention.
Figure 9B:
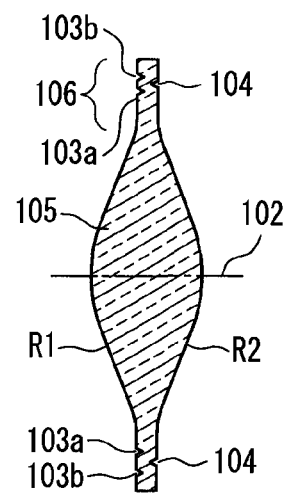

FIGS. 9A and 9B schematically illustrate a lens according to Embodiment 4 of the present invention. FIG. 9A is a plan view of the lens in the optical axis direction, and FIG. 9B is a cross-sectional view of the lens shown in FIG. 9A, taken along the line X-X. In FIG. 9B, a lens effective part 105 is formed with a left lens surface R1 and a right lens surface R2.

As shown in FIGS. 9A and 9B, a lens 101 of the present embodiment has a lens effective part 105 in a biconvex lens shape around an optical axis 102 of the lens 101, and an edge part 106 in a doughnut shape as viewed in a plan view, which is extended along the outer periphery of the lens effective part 105. The edge part 106 and the lens effective part 105 are molded integrally and simultaneously with a resin. As a material of the resin, "ZEONEX" (registered trademark) E48R manufactured by ZEON Corporation, for example, can be used. To obtain required optical properties, the lens effective part 105 is designed so as to become an aspherical lens having an aspherical shape axisymmetric with respect to the optical axis 102. The refractive index, transmittance, and other properties of the material are selected appropriately according to the required optical properties of the lens 101.

It should be noted that though in the present embodiment the lens 101 is produced by resin molding, it is possible to apply the present invention to a lens produced by glass molding using optical glass, or a hybrid-type lens obtained by forming a resin layer on a spherical glass. Further, on at least a surface of the lens effective part 105, about one to four thin films of magnesium fluoride ($MgF_2$), silicon dioxide ($SiO_2$), etc., having different refractive indices, respectively, are formed by vapor deposition as an anti-reflection (AR) coating for preventing reflection.

In a lens barrel part in an imaging device according to Embodiment 6, which will be described later, one or a plurality of lenses 101 are incorporated, whereby a predetermined image forming optical system is formed. In other words, an image forming system is configured so that light incident on the lens effective part 105 is focused on a predetermined position (on a light-receiving surface of a solid-state imaging element). Here, the edge part 106 of the lens 101 has a function of positioning and fixing the lens 101 with respect to the lens barrel. Both surfaces of the edge part 106 (surfaces perpendicular to the optical axis) are formed so as to be two smooth and flat surfaces parallel with each other.

On a first surface of the edge part 106 (surface on the lens surface R1 side), two grooves (hereinafter referred to as annular grooves) 103a and 103b, which are concentric circles close to each other, around the optical axis 102 as the center, and each of which has a V-shaped cross section, are formed as annular indices around the optical axis 102 as the center, with which the dimensional accuracy of the lens surface can be detected. On a second surface of the edge part 106 (surface on the lens surface R2 side), one annular groove 104 is formed, which is around the optical axis 102 as the center and is positioned, as observed in a plan view, between the two closely-provided annular grooves 103a and 103b formed on the first surface. These annular grooves 103a, 103b, and 104 are formed simultaneously when the lens 101 (the lens effective part 105 and the edge part 106) is formed by resin molding. These annular grooves 103a, 103b, and 104 have a function of facilitating the checking of eccentricity and the like of the lens surfaces R1 and R2 of the lens 101. Before the function is described, the resin molding of the lens 101 is described below.

The lens 101 is molded in the same process as the injection molding used for producing a usual resin product, whereas a higher dimensional accuracy is required as compared with the usual resin product, and it is necessary to reduce the contamination with dust or the like as much as possible. Therefore, the molding machine is placed in an air-conditioned clean room, and the temperature control of the molding machine is performed accurately. For example, it is necessary to maintain the cleanness class to about 10,000. It is known that in the resin molding, the size and the like subtly vary with the molding pressure, the injection rate, the holding time, the die temperature, the ambient temperature, etc., and hence, it is necessary to monitor the dimensional accuracy of the molded lens 101.

In evaluating the accuracy of the molded lens, in the case of an aspherical lens, it is necessary to perform shape measurement using the above-described AFM (e.g. UA3P manufactured by Matsushita Electric Industrial Co., Ltd.). This measurement is a complicated operation carried out for each molding lot, or at the timings of the start, midpoint, end, or the like for a molding lot. For the purpose of facilitating such a measuring operation, the two annular grooves 103a and 103b are formed on the first surface of the edge part 106, and the annular groove 104 is formed on the second surface thereof. Since the lens effective part 105 and the edge part 106 of the lens 101 are molded simultaneously, the various kinds of factors that are considered to degrade the accuracy in the molding of the lens 101 (lens effective part 105) also affect the edge part 106. Then, by observing the annular grooves 103a, 103b, and 104 formed on the edge part 106, the eccentricity of each aspheric surface (each face eccentricity) that degrades the resolution of the lens 101 (lens effective part 105), for example, can be evaluated.

The shape of the lens 101 according to the present embodiment is described below. In FIG. 9B, the lens effective part 105 has a lens surface R1 on the left and a lens surface R2 on the right. In one example, the lens surface R1 has a diameter of d) 1.5 mm around the optical axis 102 as the center, while the lens surface R2 has a diameter of Φ1.4 mm. The annular groove 103a has a diameter of Φ2.50 mm, the annular groove 103b has a diameter of Φ2.52 mm, and the annular groove 104 has a diameter of Φ2.51 mm. Therefore, when there is no eccentricity, the annular grooves 103a, 104, and 103b are arranged in the stated order from the inside to the outside at pitches of 5 μm at certain positions in the circumferential direction. The edge part 106 has an outer diameter of Φ4.2 mm, and a thickness of about 0.8 mm.

Figure 10A:
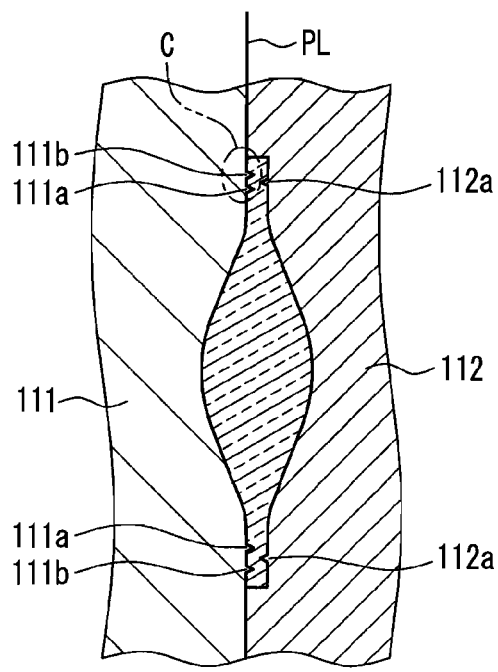
FIG. 10A conceptually illustrates a partial cross section of a die and the lens shown in FIGS. 9A and 9B when the lens is formed by injection molding.
Figure 10B:
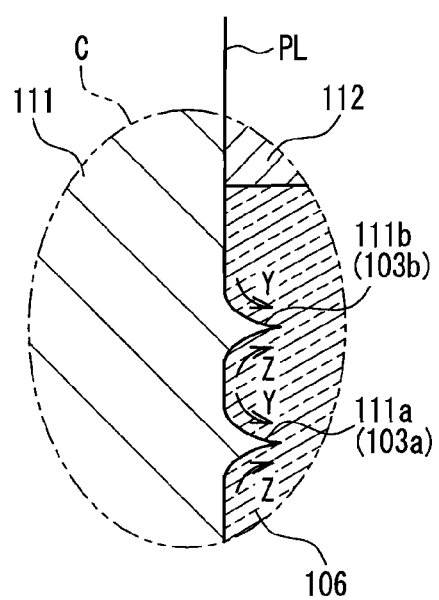
FIG. 10B is an enlarged view of a part of FIG. 10A.

Next, the annular grooves 103a, 103b, and 104 formed in the edge part 106 are described below in detail, with reference to FIGS. 10A and 10B. FIG. 10A conceptually illustrates a partial cross section of a die and the lens shown in FIGS. 9A and 9B when the lens is formed by injection molding. FIG. 10B is an enlarged view of the part C shown in FIG. 10A. The die is made of tool steel, and is attached to a die set of an injection molding machine. As to the die for a lens, a block referred to as an insert part is machined separately, and incorporated into a base. The insert part is produced by machining ultrahigh-strength steel or tool steel into a rough shape, and then plating surfaces of the same with a material having a high hardness such as Ni. The plated portions further are subjected to precision machining using a precision lathe or the like.

In FIGS. 10A and 10B, PL indicates a parting line (parting plane) of the die. On a die 111 on the left, a recessed surface is formed for molding the lens surface R1 of the lens effective part 105. On a die 112 on the right, a recessed surface is formed for molding the lens surface R2 of the lens effective part 105, and around the recessed surface, a step-like recess is formed for forming the edge part 106. Resin injected through a gate (not shown) is filled in a space enclosed by the left die 111 and the right die 112, whereby the molding is performed. Annular projected portions 111a, 111b, and 112a corresponding to the annular grooves 103a, 103b and 104, respectively, are formed on flat surface parts of the left and right dies 111 and 112, which correspond to the two parallel flat surfaces of the edge part 106, respectively.

FIG. 10B shows enlarged cross-sectional shapes of the annular projected portion 111a and 111b. More specifically, the annular projected portions 111a and 111b, which project rightward from a plane of the left die 111 corresponding to the parting line, have approximately triangular cross sections with acute ends, respectively. In one example, each of these approximately triangular cross sections has a base (length of a bottom) of about 10 μm, and a height of about 4 μm. In FIG. 10B, the annular projected portions are drawn with their height being exaggerated. The shapes of the annular projected portions 111a and 111b having the approximately triangular cross sections with acute ends are transferred to the edge part 106 of the lens 101, whereby the annular grooves 103a and 103b, each having a V-letter-shaped cross section having an acute end, are formed. It should be noted that when the lens is molded with glass, a material in a ball shape or a disk shape is placed in a die and is softened by high-temperature heating, whereby a required shape is transferred. The basic concepts in this case are identical to those in the case of resin molding, though being different in the steps and the die configuration.

Figure 11:
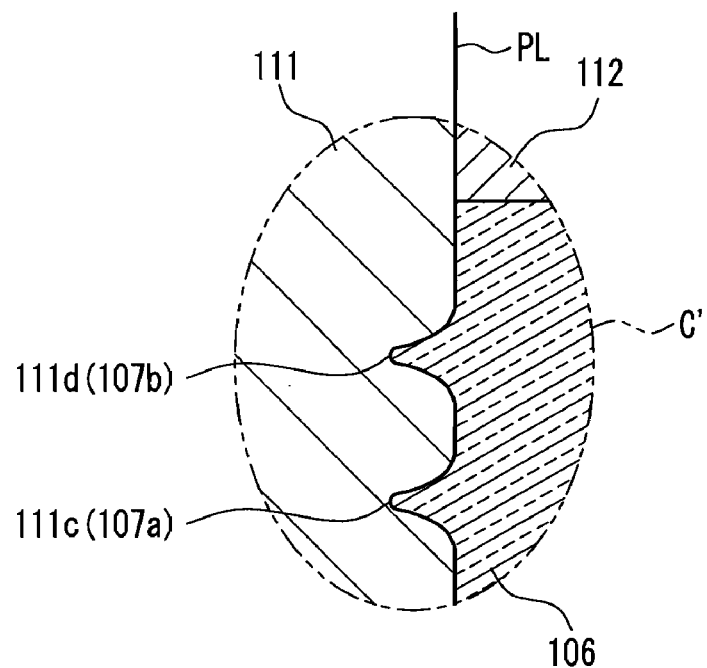
FIG. 11 is a drawing corresponding to FIG. 10B on the assumption that an annular projected portion is formed in the edge part of the lens, instead of the annular groove.

FIG. 11 is a drawing corresponding to FIG. 10B on the assumption that an annular projected portion (denoted with C') is formed in the edge part of the lens, instead of the annular groove. The basic function of the annular grooves 103a, 103b, and 104 is to facilitate the checking of the dimensional accuracy of the molded lens 101, as described above. In view of this function, it is considered to be feasible to form annular projected portions on the edge part 106 of the lens 101, instead of the annular grooves 103a, 103b, and 104.

However, as shown in FIG. 11, in the case where annular projected portions 107a and 107b are formed on the edge part 106, it is impossible to allow the annular projected portions 107a and 107b to have shapes with acute ends. In order to allow the annular projected portions 107a and 107b to have shapes with acute ends, it is necessary to form V-shaped grooves in the corresponding die 111, but it is difficult to machine the ends (bottoms) into acute shapes. This is because a tip of a cutting tool used for machining the die unavoidably has a rounded shape having a certain radius (curved shape), as shown in FIG. 4.

FIG. 4 is a perspective view illustrating a shape of a tip part of a cutting tool for machining the die. This cutting tool 14 is a diamond bite having diamond attached to a tip 14a thereof. In one example, the radius of the tip (radius of curvature) of the cutting tool 14 is about 2.3 μm. Therefore, as shown in FIG. 11, the ends (bottoms) of the V-shaped grooves 111c and 111d formed in the die 111 has rounded shapes each of which has a radius of about 2.3 μm, and the ends of the annular projected portions 107a and 107b of the edge part 106, to which the foregoing shapes are transferred, also have rounded shapes each having a radius of about 2.3 μm. In the case where the dimensional accuracy of the lens 101 is measured using the annular projected portions 107a and 107b in such a shape having a rounded end, it is difficult to improve the measurement accuracy.

In contrast, in the lens 101 of the present embodiment, the annular projected portions 111a, 111b, and 112a, which are formed on the dies 111 and 112 so that annular grooves 103a, 103b, and 104 are formed in the edge part 106, are allowed to have the shapes having sufficiently acute ends. In other words, even if the cutting tool having a tip 14a in a round shape as shown in FIG. 4 is used, the machining may be performed by causing the tool to trim slanting surfaces of the annular projected portions 111a, 111b, and 112a from the outer radius side and from the inner radius side of the die as shown in FIG. 10B, whereby the annular projected portions 111a, 111b, and 112a are easily caused to have shapes having acute ends. As a result, the cross section of each of the annular grooves 103a, 103b, and 104 formed on the edge part 106 of the molded lens 101 is made to have a V-letter shape having an acute end, whereby the measurement of the dimensional accuracy of the lens 101 with use of the annular grooves 103a, 103b, and 104 can be performed with good accuracy.

In the machining of dies, in order that the machining accuracy for the annular grooves 103a, 103b, and 104 corresponding to the surfaces R1 and R2 of the lens effective part 105 is improved, portions corresponding to the same are machined simultaneously.

Next, the method for measuring each face eccentricity of the lens 101 with use of the annular grooves 103a, 103b, and 104 is described below. First, the lens 101 is set on a microscope or the like, and parallel light is projected in the direction along the optical axis 102 of the lens 101. Then, three annular lines are observed, which are formed by the annular grooves 103a, 103b, and 104 formed on the edge part 106. As described above, since the annular grooves 103a, 103b, and 104 have a V-shaped cross section having an acute end, the three annular lines are observed as clear-cut thin lines. Besides, since both the surfaces of the edge part 106 are flat and smooth surfaces parallel with each other, only slight refraction or scattering occurs with the incident parallel light. Therefore, it is possible to observe the annular lines corresponding to the annular grooves 103a, 103b, and 104 with good accuracy.

Figure 12:
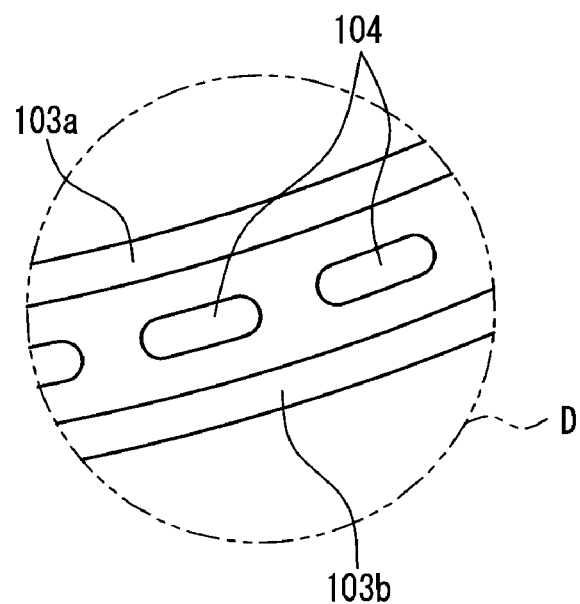
FIG. 12 is an enlarged view of a part D shown in FIG. 9A.

Further, since a microscope has a small depth of field, it is necessary to pick up two images at different positions in the optical axis direction and synthesize the two images, in order to simultaneously observe the three annular lines corresponding to the annular grooves 103a, 103b, and 104 at the same time. As a microscopic system capable of performing such processing, for example, a metallurgical microscope high-depth-of-field image analysis system DF-2 produced by Olympus Corporation is well known. Alternatively, a confocal scanning microscope may be used. A method of observing the lines with use of a projector or the like may be applicable as a simpler observing method. Besides, it is desirable that light having an appropriate wavelength according to the visibility of the annular grooves 103a, 103b, and 104 is used as light to be transmitted through the lens 101. In the case of the lens 101 of the present embodiment, when the annular grooves 103a, 103b, and 104 formed on both the surfaces of the edge part 106 are observed by a microscope, they are observed as three concentric circles close to one another as shown in FIG. 9A. More specifically, between two annular solid lines corresponding to the annular grooves 103a and 103b formed on the first surface of the edge part 106, one annular broken line corresponding to the annular groove 104 formed on the second surface is observed. It should be noted that in the present embodiment, each of the annular grooves 103a and 103b is one continuous groove, but the annular groove 104 is formed discontinuously in the broken line form in the circumferential direction. An enlarged view of the part D in FIG. 9A is shown in FIG. 12.

Since the annular grooves 103a and 103b on the first surface of the edge part 106 and the lens surface R1 are formed simultaneously with the same die 111, the dimensional accuracy of the annular grooves 103a and 103b reflects the dimensional accuracy such as eccentricity of the lens surface R1. Likewise, since the annular groove 104 on the second surface and the lens surface R2 are formed simultaneously with the same die 112, the dimensional accuracy of the annular groove 104 reflects the dimensional accuracy of the lens surface R2. Further, the annular grooves 103a and 103b are arranged closely with each other, and the spacing therebetween is provided with an accuracy at the same level as that of the die accuracy. In the present embodiment, the diameters of the three annular grooves 103a, 104, and 103b are set so as to increase in this order by 10 µm. Therefore, if the three annular lines corresponding to the three annular grooves 103a, 104, and 103b are observed at substantially same spacings, it is assumed that the respective dimensional accuracies of the lens surfaces R1 and R2 are excellent.

Further, the dimensional accuracy (presence or absence of eccentricity) of the lens surfaces R1 and R2 can be determined to a certain extent by merely checking whether or not the annular line corresponding to the annular groove 104 is positioned between two annular lines corresponding to the annular grooves 103a and 103b. If the center of the surface R1 has an eccentricity of 2 µm in a certain direction and the center of the surface R2 shifts by 3 µm in the opposite direction, the annular line corresponding to the annular groove 104 is observed as partially overlapping one or both of the two annular lines corresponding to the annular grooves 103a and 103b. If the eccentricity is 5 µm or greater, the eccentricity can be detected without failure. The lens 101 of the present embodiment is designed so as to have an eccentricity tolerance of 10 µm, and in the case where the lens has an eccentricity exceeding the foregoing tolerance, the eccentricity can be detected sufficiently by observing the annular grooves 103a, 103b, and 104.

If a further greater eccentricity occurs, the three annular lines corresponding to the annular grooves 103a, 104, and 103b are observed as overlapping at two positions. In the case where such a greater eccentricity is tolerable in view of the lens design, the differences of the diameters of the three annular grooves 103a, 104, and 103b may be set to greater values. For example, by setting each of the differences of the diameters to twice the eccentricity tolerance, the evaluation of the eccentricity between the two lens surfaces R1 and R2 can be performed with good accuracy. In contrast, if the eccentricity tolerance is small, each of the differences of the diameters of the annular grooves 103a, 104, and 103b may be set to a smaller value.

Next, FIGS. 13A to 13D explain the visibility of the three annular grooves formed on the lens according to Embodiment 4 of the present invention. FIGS. 13A and 13B schematically illustrate parts in the circumferential direction of the three annular grooves 103a, 104, and 103b formed on the edge part 106 of the lens 101 according to the present embodiment. In the state shown in FIG. 13A, the annular groove 104 on the second surface is positioned just at the midpoint between the annular grooves 103a and 103b on the first surface of the edge part 106. This state indicates that no eccentricity has occurred between the two lens surfaces R1 and R2. In the state shown in FIG. 13B, it can be viewed easily that the annular groove 104 on the second surface shifts slightly leftward (inward) with respect to the midpoint between the annular grooves 103a and 103b on the first surface. This state indicates that eccentricity has occurred between the two lens surfaces R1 and R2.

FIGS. 13C and 13D are comparative views that show the cases where the presence or absence of eccentricity is checked only with the two annular grooves 104 and 103b. In other words, this state corresponds to the state in which among the annular grooves 103a and 103b on the first surface of the edge part 106, one groove, i.e., the groove 103a, is removed, and the other one, i.e., the groove 103b remains. FIG. 13C corresponds to FIG. 13A, while FIG. 13D corresponds to FIG. 13B. In the present case, the presence or absence of eccentricity is checked by referring to the spacing, large or small, between the two annular grooves (lines) 104 and 103b. Clearly, as compared with this checking scheme, the checking scheme in which the three annular grooves 103a, 104, and 103b are used as is the case with the present embodiment shown in FIGS. 13A and 13B allows for better visibility, and with this scheme, even a slight eccentricity can be determined visually.

Alternatively, by measuring respective degrees of roundness of the three annular grooves 103a, 104, and 103b, the respective dimensional accuracies of the lens surfaces R1 and R2 can be estimated. In this case, charts of perfect circles are prepared in a projector or the like in advance, and differences of projected images of the annular grooves 3 and 4 from the charts may be observed; by so doing, simple evaluation is enabled. If ranges of roundness tolerances are shown in the charts, the evaluation is made even easier. Preferably, the correlation between the roundness degrees of the annular grooves 103a, 104, and 103b and the optical properties of the lens is evaluated in advance. The lenses 101 of the present embodiment were produced under various molding conditions, and optical properties of the lenses were evaluated. Consequently, it was confirmed from the experimental design that if the foregoing eccentricity fell in the range of eccentricity tolerance, even without the evaluation of the roundness, the other required shape accuracy and the like can be achieved sufficiently. Therefore, by evaluating the eccentricity of the annular grooves 103a, 104, and 103b, the dimensional accuracy in relation to the required optical properties of the lens 101 can be ensured.

Embodiment 5

Figure 15:
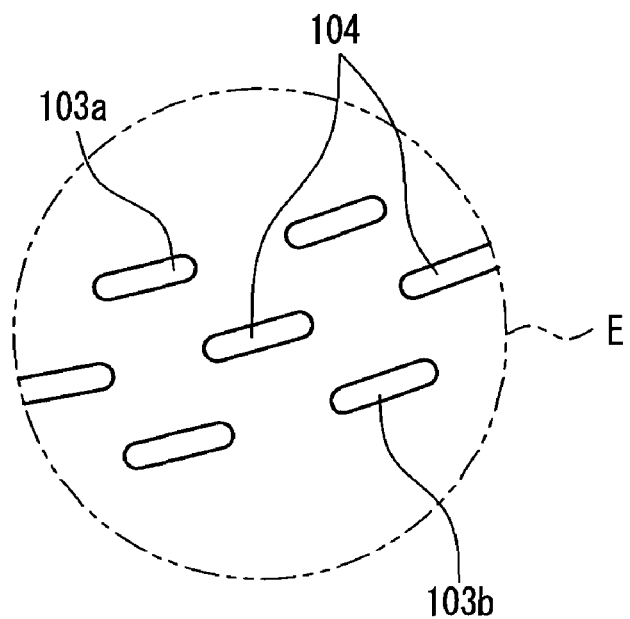
FIG. 15 is an enlarged view of the part E shown in FIG. 14.

Next, a lens according to Embodiment 5 of the present invention is described below, with reference to FIGS. 14, 15, and 16A to 16D. FIG. 14 is a plan view of the lens according to Embodiment 5 of the present invention. FIG. 15 is an enlarged view of the part E shown in FIG. 14. FIGS. 16A to 16D explain the visibility of three annular grooves formed on the lens according to Embodiment 5 of the present invention.

The fundamental principles for a lens 101 of the present embodiment regarding the shape, the material, the producing method, etc. are identical to those of the lens according to Embodiment 4. The difference of the lens 101 according to the present embodiment from the lens according to Embodiment 4 is as follows: the two annular grooves 103a and 103b formed on the first surface are divided into a plurality of segments along respective circumferential directions at the same angular pitches and phases, whereas the one annular groove 104 formed on the second surface is divided also into a plurality of segments in the circumferential direction, so that the segments of the two annular grooves 103a and 103b and the segments of the one annular groove formed on the second surface are arranged alternately in the circumferential direction, as viewed in a plan view.

In FIG. 14, the annular grooves 103a and 103b corresponding to the lens surface R1, and the annular groove 104 corresponding to the lens surface R2 are arranged in a concentric circle form around the optical axis as the center, and the diameters of the annular grooves (circles) are identical to those of the lens 101 according to Embodiment 4. As clear from the partial enlarged view of FIG. 15, the annular grooves 103a and 103b are divided into a plurality of segments along the respective circumferential directions at the same angular pitches and phases. The annular groove 104 positioned between the annular grooves 103a and 103b also is divided into a plurality of segments in the circumferential direction, so that the annular grooves 103a, 103b and the annular groove 104a are arranged alternately in the circumferential direction, as viewed in a plan view. In other words, each of the annular grooves 103a, 104, and 103b is formed in a stitching-line-like form, and they have the phase relationship such that the segments of the annular grooves 103a and 103b and the segments of the annular groove 104 are arranged alternately in the circumferential direction. As a result, the segments of the annular grooves 103a and 103b and the segments of the annular groove 104 compensate each other to form a substantially continuous circle.

It should be noted that the circle formed by the segments of the annular grooves 103a and 103b and the segments of the annular groove 104 is not necessarily completely continuous. They may be formed so that there are gaps between segments of the annular grooves 103a and 103b and the segments of the annular groove 104. To the contrary, the segments of the annular grooves 103a and 103b and the segments of the annular groove 104 may be formed so as to overlap partially. Alternatively, in order that the annular grooves 103a and 103b and the annular groove 104 can be distinguished easily, the segments thereof may be made different. Further alternatively, the annular grooves 103a and 103b and the annular groove 104 may be formed in different kinds of lines; for example, one is formed in a dotted line form while the other is formed in an alternate long and short dashed line.

As one of the methods for dividing the annular grooves 103a, 103b, and 104 into segments in the circumferential direction like broken lines, a method is available in which acute shapes of a die corresponding to ends of the annular grooves 103a, 103b, and 104 are rounded intermittently in the circumferential direction by etching or discharge processing, so that the lines are blurred (made invisible). Further, another method is available in which the annular projected parts of a die corresponding to the annular grooves 2103a and 103b and 104 are removed intermittently in the circumferential direction.

Figure 16A:
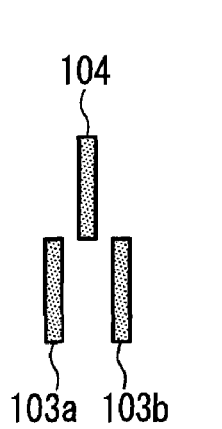
FIGS. 16A to 16D explain the visibility of three annular grooves formed on a lens according to Embodiment 5 of the present invention.
Figure 16B:
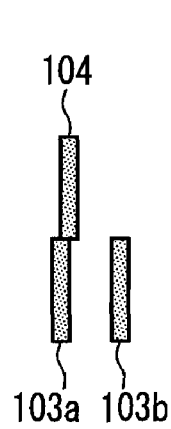

Next, the visibility of the three annular grooves 103a, 103b, and 104 formed on the lens 101 according to the present embodiment is described, with reference to FIGS. 16A to 16D. FIGS. 16A and 16B schematically illustrate parts in the circumferential direction of the three annular grooves 103a, 104, and 103b formed on the edge part 106 of the lens 101 according to the present embodiment. In the state of FIG. 16A, the annular groove 104 on the second surface is positioned just at the midpoint between the annular grooves 103a and 103b on the first surface of the edge part 106. This state indicates that no eccentricity has occurred between the two lens surfaces R1 and R2. In the state shown in FIG. 16B, it can be viewed easily that the annular groove 104 on the second surface shifts slightly leftward (inward) with respect to the midpoint between the annular grooves 103a and 103b on the first surface. This state indicates that eccentricity has occurred between the two lens surfaces R1 and R2.

Figure 16C:
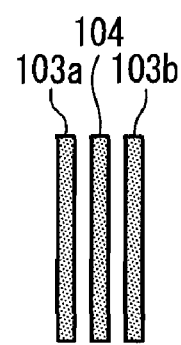
Figure 16D:
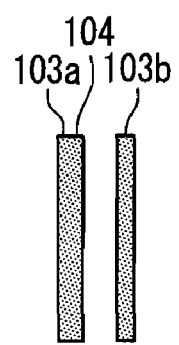

FIGS. 16C and 16D are comparative views that show the cases where the presence or absence of eccentricity is checked only with the three annular grooves on the lens of Embodiment 4. It should be noted that the thicknesses of the three lines corresponding to the annular grooves 103a, 104, and 103b are increased, which narrows the pitches, as compared with the configuration shown in FIGS. 13A and 13B referred to in the description of Embodiment 4. FIG. 16C corresponds to FIG. 16A, while FIG. 16D corresponds to FIG. 16B. There is no problem in visibility in the case of FIG. 16C in which the annular groove 104 is positioned just at the midpoint between the annular grooves 103a and 103b, whereas the visibility is impaired in the state of FIG. 16D in which the annular grove 104 shifts leftward (inward) with respect to the midpoint between the annular grooves 103a and 103b whereby the annular groove 104 overlaps the annular groove 103a. The overlapping state can be estimated from the increased thickness of the line, but it is not easy to determine the line thickness actually. In contrast, in the state shown in FIG. 16B according to the present embodiment, the segments obtained by dividing the annular grooves 103a, 104, and 103b are displayed like a main scale and a vernier scale composing a so-called vernier caliper, whereby the annular groove 104 and the annular groove 103a or 103b do not overlap each other completely even if they are positioned closer. Thus, high visibility is ensured.

The lens 101 according to the present embodiment facilitates the visual determination of the eccentricity of the lens surfaces R1 and R2 by referring to the position relationship of the annular grooves 103a, 104, and 103b divided into a plurality of segments in the circumferential direction. As compared with the lens of Embodiment 4, a further smaller eccentricity can be detected visually. Further, regarding the roundness, this facilitates the visual determination about at which position (phase) in the circumferential direction the degree of roundness degrades.

Embodiment 6

Figure 17:
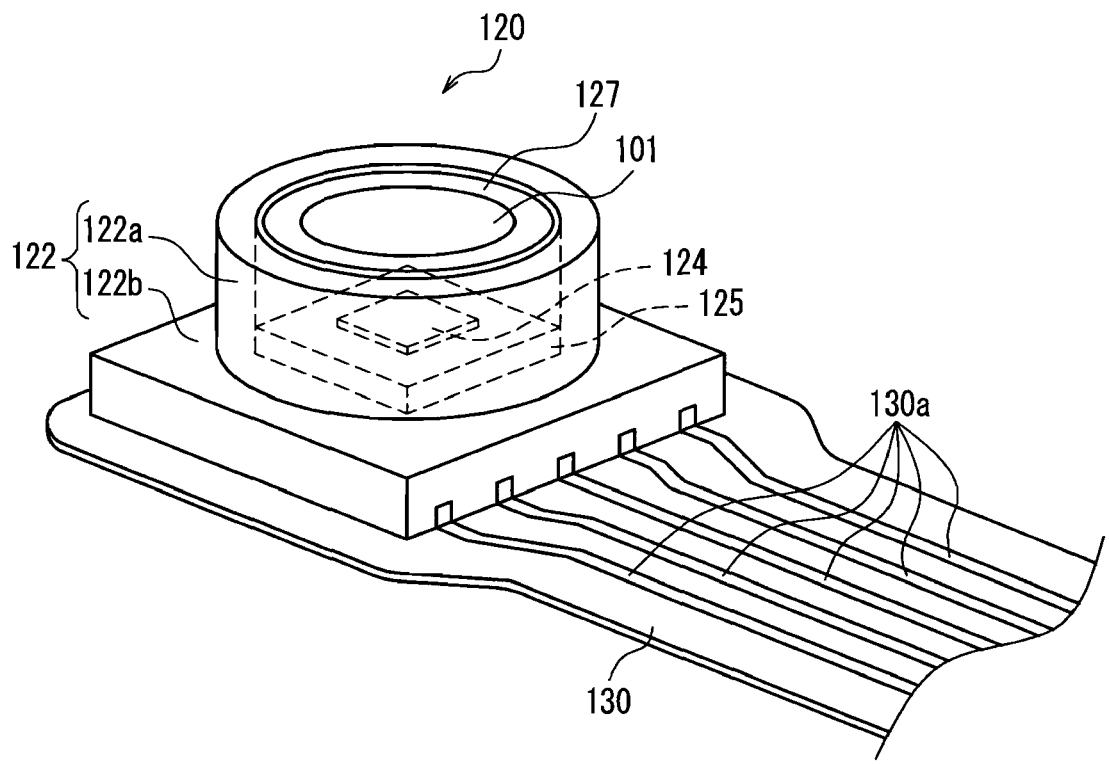
FIG. 17 is a perspective view of an imaging device according to Embodiment 6 of the present invention.
Figure 18:
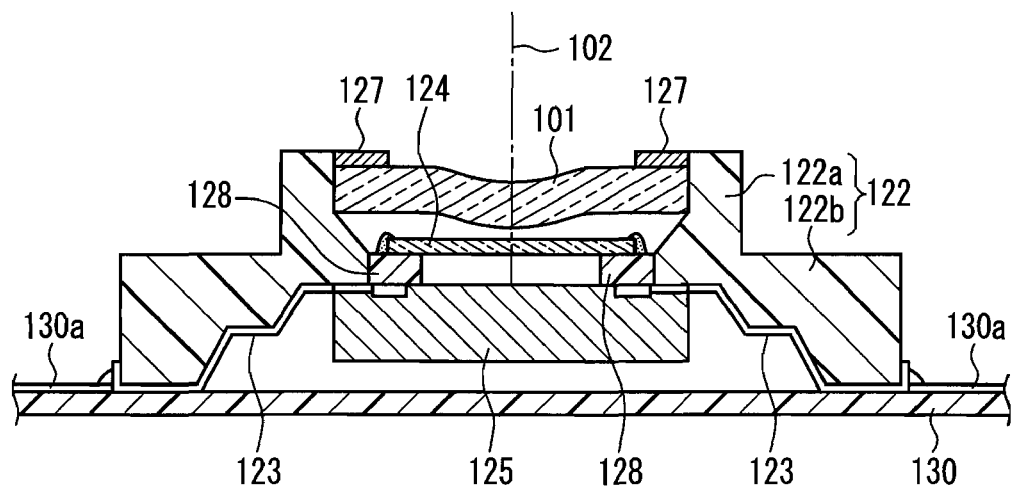
FIG. 18 is a cross-sectional view of the imaging device shown in FIG. 17, viewed from a side.

Next, an imaging device in which the lens according to Embodiment 4 or 5 is used is described as Embodiment 6 of the present invention. FIG. 17 is a perspective view of an imaging device in which the lens of the present invention is used. This imaging device 120 is a camera module for use in a mobile telephone. FIG. 18 is a cross-sectional view of the imaging device shown in FIG. 17, viewed from a side.

The imaging device 120 includes a lens 101 having an optical axis 102, an optical filter 124, a semiconductor imaging element 125, a three-dimensional substrate 122 for holding these, and a flexible printed circuit board (FPC) 130 connected with the three-dimensional substrate 122 to transmit/receive signals to/from the outside. The three-dimensional substrate 122 serves also as a holding member for holding the semiconductor imaging element 125 and the optical filter 124. The three-dimensional substrate 122 has a cylindrical lens barrel part 122a and a bottom part 122b extending from an end side of the lens barrel part 22a outward.

The lens 101 is fitted and fixed in an inner circumferential surface of the lens barrel part 122a of the three-dimensional substrate 122. It should be noted that though the lens 101, whose cross section is shown in FIG. 18, is a concavo-convex lens, a biconvex lens of Embodiment 4 or 5 as shown in the drawings may be used instead, or alternatively, a planoconvex lens may be used instead. Further, though the cross-sectional view of FIG. 18 shows only one lens, a plurality of lenses are installed actually in many cases. For example, two lenses are used in combination so as to configure a deep-focus optical system capable of focusing a subject at a certain distance (e.g. 30 cm) or farther. On the lens 101, a diaphragm 127 for fixing the lens 101 while achieving a predetermined aperture is attached.

The semiconductor imaging element 125 arranged below the lens 101 is, for example, a ¼-inch CCD having about 1,300,000 pixels and a pixel size of about 2.8 μm. The semiconductor imaging element 125 is connected electrically with a conductive pattern 123 formed on a surface of the three-dimensional substrate 122 by stud bump bonding (SBB). The conductive pattern 123 has lead lines drawn to a side face of the bottom part 122b of the three-dimensional substrate 122, which are connected with a conductive pattern 130a of the FPC 130 by soldering. The optical filter 124, disposed on the semiconductor imaging element 125 via spacers 128, serves for suppressing the transmission of light other than light in the visible light range.

Light from a subject is focused by the lens 101, and is incident on the semiconductor imaging element 125 via the optical filter 124. The semiconductor imaging element 125 outputs an electric signal according to the incident light, and the electric signals are taken out via the conductive patterns 123 and 130a to the outside. With the lens 101 of the present invention, as described above, the accuracy such that eccentricity is not more than 5 μm can be ensured easily, whereby the stability of quality and the reduction of the number of controlling steps can be achieved. This makes it possible to prevent the resolution from decreasing due to field curvature and the like in peripheral portions of the light-receiving surface of the semiconductor imaging element 125. Further, when this imaging device 120 is used in a mobile telephone with a camera function, an excellent image quality can be obtained in a range from the central part to the peripheral part of an image picked up, which contributes to the increase in the added value of the mobile telephone.

Embodiment 7

Figure 19A:
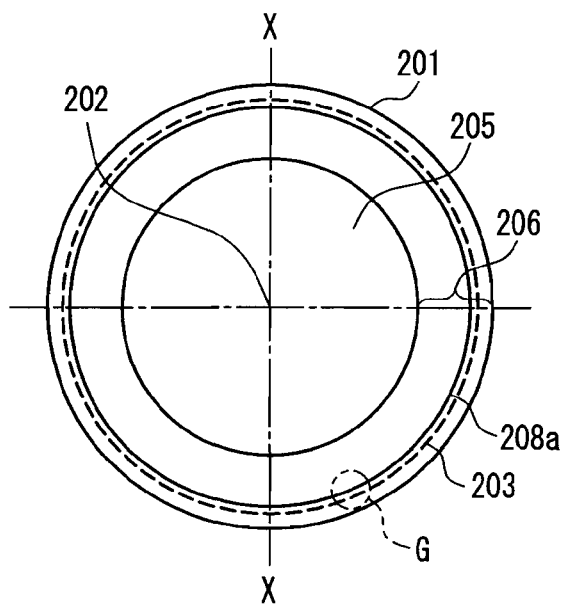
FIGS. 19A and 19B are a plan view and a cross-sectional view, respectively, for schematically illustrating a lens according to Embodiment 7 of the present invention.
Figure 19B:
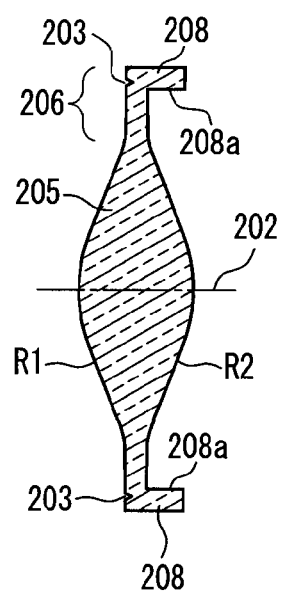

FIGS. 19A and 19B schematically illustrate a lens according to Embodiment 7 of the present invention. FIG. 19A is a plan view of the lens as viewed in the optical axis direction, and FIG. 19B is a cross-sectional view of the lens shown in FIG. 19A, taken along the line X-X. In FIG. 19B, a lens effective part 205 is formed with a left lens surface R1 and a right lens surface R2.

As shown in FIGS. 19A and 19B, a lens 201 of the present embodiment has a lens effective part 205 in a biconvex lens shape around an optical axis 202 of the lens 201 as the center, an edge part 206 in a doughnut shape as viewed in a plan view, which is extended along the outer periphery of the lens effective part 205, and a spigot joint part 208 in an annular shape around the optical axis 202 as the center, which is projected from one surface of the edge part 206 (surface on the lens surface R2 side, first surface). The lens effective part 205, the edge part 206, and the spigot joint part 208 are molded integrally and simultaneously with a resin. As a material of the resin, "ZEONEX" (registered trademark) E48R manufactured by ZEON Corporation, for example, can be used. To obtain required optical properties, the lens effective part 205 is designed so as to become an aspherical lens having an aspherical shape axisymmetric with respect to the optical axis 202. The refractive index, transmittance, and other properties of the material are selected appropriately according to the required optical properties of the lens 201.

It should be noted that though in the present embodiment the lens 201 is produced by resin molding, it is possible to apply the present invention to a lens produced by glass molding using optical glass, or a hybrid-type lens obtained by forming a resin layer on a spherical glass. Further, on at least a surface of the lens effective part 205, about one to four thin films of magnesium fluoride ($MgF_2$), silicon dioxide ($SiO_2$), etc., having different refractive indices, respectively, are formed by vapor deposition as an anti-reflection (AR) coating for preventing reflection.

As will be described later, a lens unit obtained by coupling two lenses having slightly different shapes is incorporated in a lens barrel part in an imaging device according to Embodiment 9, whereby a predetermined image forming optical system is formed. In other words, an image forming system is configured so that light incident on the lens effective part 205 is focused on a predetermined position (on a light-receiving surface of a solid-state imaging element). Here, the edge part 206 and the spigot joint part 208 of the lens 201 have a function as a fitting part upon the coupling of two lenses, as well as a function of positioning and fixing the lens unit with respect to the lens barrel. Both surfaces of the edge part 206 (surfaces perpendicular to the optical axis) are formed so as to be two smooth and flat surfaces parallel with each other.

On a second surface of the edge part 206 (surface on the lens surface R1 side), an annular groove (hereinafter referred to as an annular groove) 203 around the optical axis 202 as the center is formed as an annular index around the optical axis 202 as the center, with which the dimensional accuracy of the lens surface can be detected. This annular groove 203 is formed at the same time when the lens effective part 205, the edge part 206, and the spigot joint part 208 are formed. In the present embodiment, the annular groove 203 is formed so as to have a diameter slightly greater than a diameter of an inner circumferential wall 208a of the spigot joint part 208, and the annular groove 203 and the inner circumferential wall 208a are viewed to be close to each other in a plan view. This annular groove 203, in association with a circle corresponding to the inner circumferential wall 208a of the spigot joint part 208, has a function of facilitating the checking of eccentricity and the like of the lens surfaces R1 and R2 of the lens 201. Before the function is described, the resin molding of the lens 201 is described below.

The lens 201 is molded in the same process as the injection molding used for producing a usual resin product, whereas a higher dimensional accuracy is required as compared with the usual resin product, and it is necessary to reduce the contamination with dust or the like as much as possible. Therefore, the molding machine is placed in an air-conditioned clean room, and the temperature control of the molding machine is performed accurately. For example, it is necessary to maintain the cleanness class to about 10,000. It is known that in the resin molding, the size and the like subtly vary with the molding pressure, the injection rate, the holding time, the die temperature, the ambient temperature, etc., and hence, it is necessary to monitor the dimensional accuracy of the molded lens 201.

In evaluating the accuracy of the molded lens, in the case of an aspherical lens, it is necessary to perform shape measurement using the above-described AFM (e.g. UA3P manufactured by Matsushita Electric Industrial Co., Ltd.). This measurement is a complicated operation carried out for each molding lot, or at the timings of the start, midpoint, end, or the like for a molding lot. For the purpose of facilitating such a measuring work, circles corresponding to the annular groove 203 and the inner circumferential wall 208a of the spigot joint part 208 formed on the edge part 206 are used. Since the lens effective part 205, the edge part 206, and the spigot joint part 208 of the lens 201 are molded simultaneously, the various kinds of factors that are considered to degrade the accuracy in the molding of the lens 201 (lens effective part 205) also affect the edge part 206 and the spigot joint part 208. Then, by observing the circles corresponding to the annular groove 203 and the inner circumferential wall 208a of the spigot joint part 208 formed on the edge part 206, the eccentricity of each aspheric surface (each face eccentricity) that degrades the resolution of the lens 201 (lens effective part 205), for example, can be evaluated.

The shape of the lens 201 according to the present embodiment is described below. In FIG. 19B, among the surfaces forming the lens effective part 205, the lens surface on the left is denoted as R1, while the lens surface on the right is denoted as R2. In one example, the lens surface R1 has a diameter of Φ1.5 mm around the optical axis 202 as the center, while the lens surface R2 has a diameter of Φ1.4 mm. The annular groove 203 has a diameter of 4) 2.51 mm, and the inner circumferential wall 208a of the spigot joint part 208 has a diameter of D 2.50 mm. The edge part 206 has an outer diameter of Φ4.2 mm, and a thickness of about 0.8 mm.

Figure 20A:
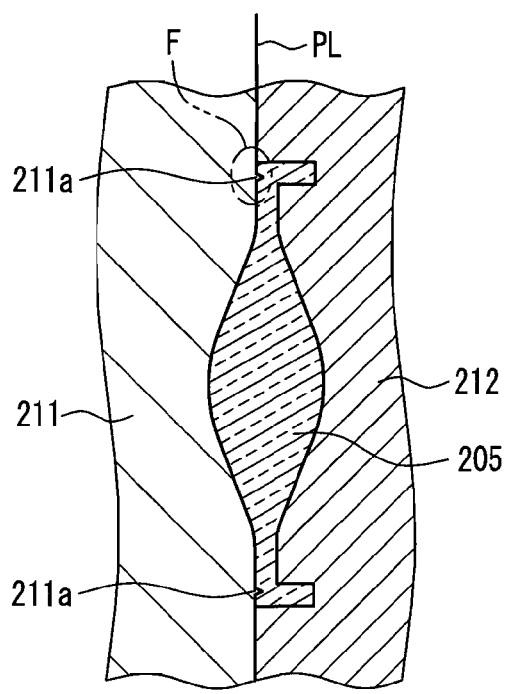
FIG. 20A conceptually illustrates a partial cross section of a die and the lens shown in FIGS. 19A and 19B when the lens is formed by injection molding.
Figure 20B:
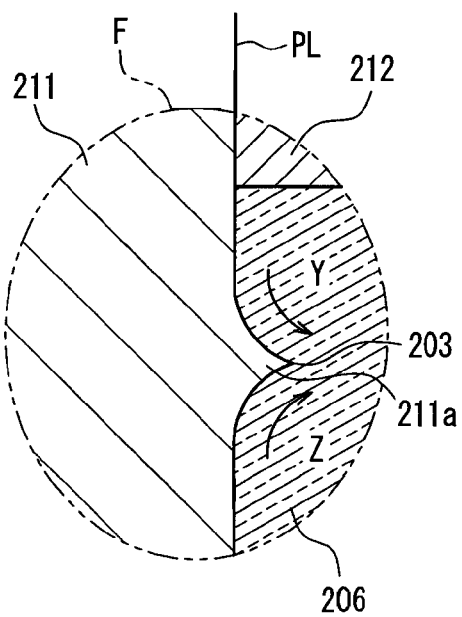
FIG. 20B is an enlarged view of a part shown in FIG. 20A.

Next, the annular groove 203 and the spigot joint part 208 formed on the edge part 206 are described below in detail, with reference to FIGS. 20A and 20B. FIG. 20A conceptually illustrates a partial cross section of a die and the lens shown in FIGS. 19A and 19B when the lens is formed by injection molding. FIG. 20B is an enlarged view of the part F shown in FIG. 20A. The die is made of tool steel, and is attached to a die set of an injection molding machine. As to the die for a lens, a block referred to as an insert part is machined separately, and incorporated into a base. The insert part is produced by machining ultrahigh-strength steel or tool steel into a rough shape, and then plating surfaces of the same with a material having a high hardness such as Ni. The plated portions are further subjected to precision machining using a precision lathe or the like.

In FIGS. 20A and 20B, PL indicates a parting line (parting plane) of the die. On a die 211 on the left, a recessed surface is formed for molding the lens surface R1 of the lens effective part 205, and an annular projected part 211a is formed which corresponds to the annular groove 203 to be formed in the edge part 206. On a die 212 on the right, a recessed surface is formed for molding the lens surface R2 of the lens effective part 205, and a step-like recess is formed for forming the edge part 206 and the spigot joint part 208. Resin injected through a gate (not shown) is filled in a space enclosed by the left die 211 and the right die 212, whereby the molding is performed.

FIG. 20B shows an enlarged cross-sectional shape of the annular projected portion 211a. More specifically, the annular projected portion 211a, which projects rightward from a plane of the left die 211 corresponding to the parting line, has an approximately triangular cross section with an acute end. In one example, the approximately triangular cross section has a base (length of a bottom) of about 30 μm, and a height of about 8 μm. In FIG. 20B, the annular projected portion 211a is drawn with its height being exaggerated. The shape of the annular projected portion 211a having the approximately triangular cross section with an acute end is transferred to the edge part 206 of the lens 201, whereby the annular groove 203 having a V-letter-shaped cross section having an acute end is formed. With regard to an angled portion between the inner circumferential wall 208a of the spigot joint part 208 and the edge part 206, the portion is formed so as to have a non-round, right-angled edge. It should be noted that in the case where the lens is made of glass, a material in a ball shape or a disk shape is placed in a die and is softened by high-temperature heating, whereby a required shape is transferred. The basic concepts in this case are identical to those in the case of resin molding, though being different in the steps and the die configuration.

Figure 21:
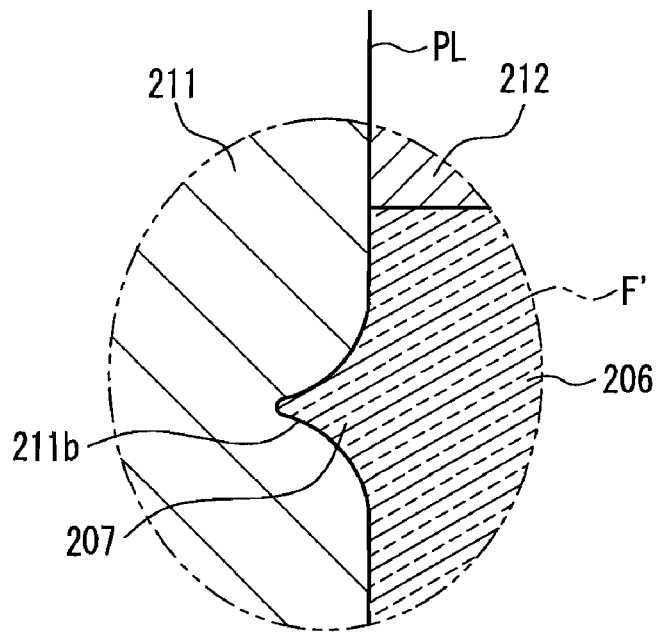
FIG. 21 is a drawing corresponding to FIG. 20B on the assumption that an annular projected portion is formed in the edge part of the lens, instead of the annular groove.

FIG. 21 is a drawing corresponding to FIG. 20B on the assumption that an annular projected portion (denoted with F') is formed in the edge part of the lens, instead of the annular groove. The basic function of the annular groove 203 is to facilitate the checking of the dimensional accuracy of the molded lens 201, as described above. In view of this function, it is considered to be feasible to form annular projected portions, instead of the annular groove 203, on the edge part 206 of the lens 201.

However, as shown in FIG. 21, in the case where the annular projected portion 207 is formed on the edge part 206, it is impossible to allow the annular projected portion 207 to have a shape with an acute end. In order to allow the annular projected portion 207 to have a shape with an acute end, it is necessary to form a V-shaped groove in the corresponding die 211, but it is difficult to machine the end (bottom) into an acute shape. This is because a tip of a cutting tool used for machining the die unavoidably has a rounded shape having a certain radius (curved shape), as shown in FIG. 4.

FIG. 4 is a perspective view illustrating a shape of a tip part of a cutting tool for machining the die. This cutting tool 14 is a diamond bite having diamond attached to a tip 14a thereof. In one example, the radius of the tip (radius of curvature) of the cutting tool 14 is about 2.3 μm. Therefore, as shown in FIG. 21, the end of the V-shaped groove 211b formed in the die 211 has a rounded shape having a radius of about 2.3 μm, and the end of the annular projected portion 207 of the edge part 206, to which the foregoing shape is transferred, also has a rounded shape having a radius of about 2.3 μm. In the case where the dimensional accuracy of the lens 201 is measured using the annular projected portion 207 in such a dull shape having a rounded end, it is difficult to improve the measurement accuracy.

In contrast, in the lens 201 of the present embodiment, the annular projected portion 211a, which is formed on the die 211 so that the annular groove 203 is formed in the edge part 206, is allowed to have the shape having a sufficiently acute end. In other words, even if the cutting tool having a tip 14a in a round shape as shown in FIG. 4 is used, the machining may be performed by causing the tool to trim slanting surfaces of the annular projected portion 211a from the outer radius side and from the inner radius side of the die in the directions as shown by arrow lines Y and Z in FIG. 20B, whereby the annular projected portion 211a is allowed to have a shape having an acute end. As a result, the cross section of the annular groove 203 formed on the edge part 206 of the molded lens 201 is made to have a V-letter shape having an acute end. For the same reason, the angled portion between the inner circumferential wall 208a of the spigot joint part 208 and the edge part 206 can be formed so as to have a non-round, right-angled edge. By doing so, the measurement of the dimensional accuracy of the lens 201 with use of the circles corresponding to the annular groove 203 and the inner circumferential wall 208a can be performed with good accuracy.

In the machining of dies, in order that the accuracy for the relative relationship among the annular groove 203, the spigot joint part 208, the inner circumferential wall 208a thereof, etc., corresponding to the surfaces R1 and R2 of the lens effective part 205 is ensured sufficiently, portions of the die corresponding to these, respectively, are machined simultaneously.

Next, the method for measuring each face eccentricity of the lens 201 with use of circles corresponding to the annular groove 203 and the inner circumferential surface 208a of the spigot joint part 208 is described below. First, the lens 201 is set on a microscope or the like, and parallel light is projected in the direction along the optical axis 202 of the lens 201. Then, as shown in FIG. 19A, a circle corresponding to the annular groove 203 formed on the edge part 206 and a circle corresponding to the inner circumferential wall 208a of the spigot joint part 208 are observed. As described above, since the annular groove 203 has a V-shaped cross section having an acute end and the angled portion between the inner circumferential wall 208a of the spigot joint part 208 and the edge part 206 has a non-round, right-angled edge, these two circles are observed as clear-cut thin lines. Besides, since both the surfaces of the edge part 206 are flat and smooth surfaces parallel with each other, only slight refraction or scattering occurs to the incident parallel light. Therefore, it is possible to observe the two circles corresponding to the annular groove 203 and the inner circumferential wall 208a of the spigot joint part 208 with good accuracy.

Further, since a microscope has a small depth of field, it is necessary to pick up two images at different positions in the optical axis direction and synthesize the two images, in order to simultaneously observe the two circles corresponding to the annular groove 203 and the inner circumferential wall 208a of the spigot joint part 208. As a microscopic system capable of performing such processing, for example, a metallurgical microscope high-depth-of-field image analysis system DF-2 produced by Olympus Corporation is well known. Alternatively, a confocal scanning microscope may be used. A method of observing the lines with use of a projector or the like may be applicable as a simpler observing method. Besides, it is desirable that light having an appropriate wavelength according to the visibility of the annular groove 203 and the inner circumferential wall 208a of the spigot joint part 208 is used as light to be transmitted through the lens 201.

In the case of the lens 201 of the present embodiment, when the annular groove 203 and the inner circumferential wall 208a of the spigot joint part 208 formed on the edge part 206 are observed by a microscope, they are observed as two concentric circles close to one another as shown in FIG. 19A. Since the annular groove 203 of a surface of the edge part 206 and the lens surface R1 are formed simultaneously with the same die 211, the annular groove 203 is closely associated with the dimensional accuracy of the lens surface R1. Likewise, since the spigot joint part 208 and the lens surface R2 are formed simultaneously with the same die 212, the inner circumferential wall 208a thereof is closely associated with the dimensional accuracy of the lens surface R2. Therefore, if the two circles corresponding to the annular groove 203 and the inner circumferential wall 208a of the spigot joint part 208 are observed at the same spacings in the diameter direction, like concentric circles, it is assumed that the respective dimensional accuracies of the lens surfaces R1 and R2 are excellent.

As described above, in the lens 201 of the present embodiment, the diameters of the annular groove 203 and the inter circumferential wall 208a of the spigot joint part 208 are Φ2.51 mm and Φ2.50 mm, respectively, which means that a difference of 10 μm is given thereto. If the center of the surface R1 is decentered by 2 μm in a certain direction and the center of the surface R2 shifts by 3 μm in the opposite direction, the two circles corresponding to the annular groove 203 and the inner circumferential wall 208a of the spigot joint part 208 are observed as overlapping partially. If the eccentricity is 5 μm or greater, it is possible to detect the eccentricity without failure. The lens 201 of the present embodiment is designed so as to have an eccentricity tolerance of 10 μm, and if there is an eccentricity greater than the foregoing eccentricity tolerance, the eccentricity can be detected sufficiently by observing the annular groove 203 and the inner circumferential wall 208a of the spigot joint part 208.

If a further greater eccentricity occurs, the two circles corresponding to the annular groove 203 and the inner circumferential wall 208a of the spigot joint part 208 are observed as overlapping at two positions. In the case where such a greater eccentricity is tolerable in view of the lens design, the difference between the diameters of the annular groove 203 and the inner circumferential wall 208a of the spigot joint part 208 may be set to a greater value. For example, by setting the difference between the diameters of the annular groove 203 and the inner circumferential wall 208a of the spigot joint part 208 to twice the eccentricity tolerance, the evaluation of the eccentricity between the two lens surfaces R1 and R2 can be performed with good accuracy. In contrast, if the eccentricity tolerance is small, the difference between the diameters of the annular groove 203 and the inner circumferential wall 208a of the spigot joint part 208 may be set to a smaller value.

Alternatively, by measuring respective degrees of roundness of the two circles corresponding to the annular groove 203 and the inner circumferential wall 208a of the spigot joint part 208, the dimensional accuracy of the lens surfaces R1 and R2 can be estimated. In this case, charts of perfect circles are prepared in a projector or the like in advance, and differences of projected images of the annular groove 203 and the inner circumferential wall 208a of the spigot joint part 208 from the charts may be observed; by so doing, simple evaluation is enabled. If ranges of roundness tolerances are shown in the charts, the evaluation is made even easier. Preferably, the correlation between the roundness degrees of the annular groove 203 and the spigot joint part 208 and the optical properties of the lens is evaluated in advance. The lenses 201 of the present embodiment were produced under various molding conditions, and optical properties of the lenses were evaluated. Consequently, it was confirmed from the experimental design that if the eccentricity fell in the range of eccentricity tolerance, even without the evaluation of the roundness, the other required shape accuracy and the like could be achieved sufficiently. Therefore, by evaluating the eccentricity of the annular groove 203 and the inner circumferential wall 208a of the spigot joint part 208, the dimensional accuracy in relation to the required optical properties of the lens 201 can be ensured.

Further, the spigot joint part 208 is used as a fitting part upon the fitting of two lenses in the optical axis direction so as to configure a lens unit, as described later. In other words, an inner circumferential wall 208a of a spigot joint part 208 of a first lens is fitted outside an outer circumferential wall of a spigot joint part 208 of a second lens, whereby the alignment of the two lenses in the diameter direction (in other words, the alignment of the optical axes) is performed. By so doing, the alignment of the optical axes of the two lenses is performed with higher accuracy, as compared with the case where the two lenses are fixed independently in a lens barrel.

Figure 22:
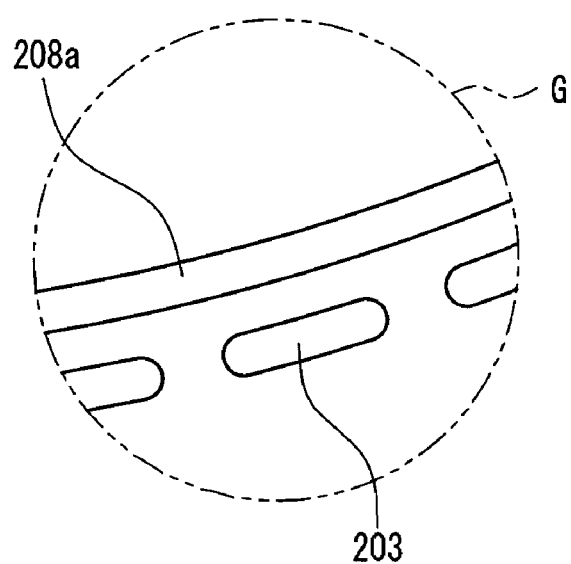
FIG. 22 is an enlarged view of a part G shown in FIG. 19A.

FIG. 22 is an enlarged view of the part G shown in FIG. 19A. It should be noted that the annular groove 203 is formed, not as a continuous groove, but as a groove discontinuous in the circumferential direction, like a broken line. This configuration facilitates the distinction of the circle corresponding to the annular groove 203 from the circle corresponding to the inner circumferential wall 208a of the spigot joint part 208, as viewed in a plan view. The annular groove 203 of course may be formed as a continuous groove, or as a discontinuous groove in another form such as an alternate long and short dashed line.

It should be noted that in the present embodiment, the annular groove 203 is formed so that the diameter of the annular groove 203 is greater than the diameter of the inner circumferential wall 208a of the spigot joint part 208, but to the contrary the annular groove 203 may be formed so that the diameter of the annular groove 203 is smaller than the diameter of the inner circumferential wall 208a of the spigot joint part 208. Alternatively, the annular groove 203 may be formed to be close to, not the circle corresponding to the inner circumferential wall 208a, but a circle corresponding to an outer circumferential wall of the spigot joint part 208, as viewed in a plan view, and these two circles may be observed so that the eccentricity and the like of the lens surfaces R1 and R2 is evaluated.

Embodiment 8

Figure 23A:
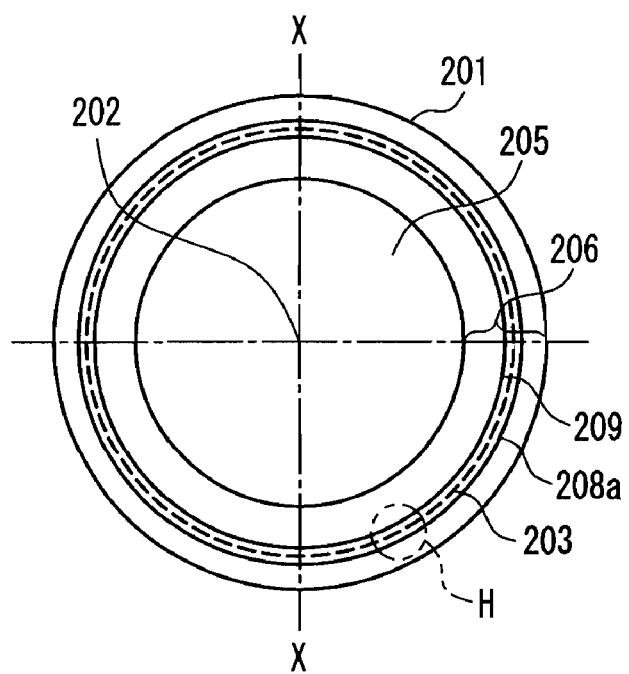
FIGS. 23A and 23B are a plan view and a cross-sectional view, respectively, for schematically illustrating a lens according to Embodiment 8 of the present invention.
Figure 23B:
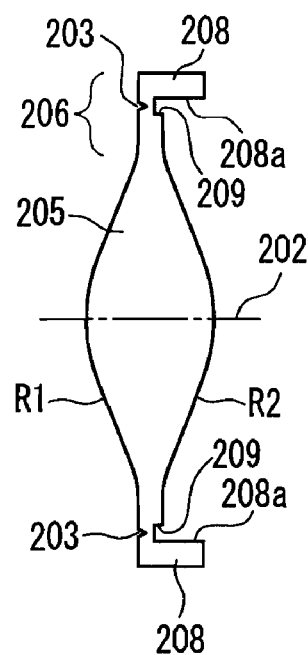
Figure 24:
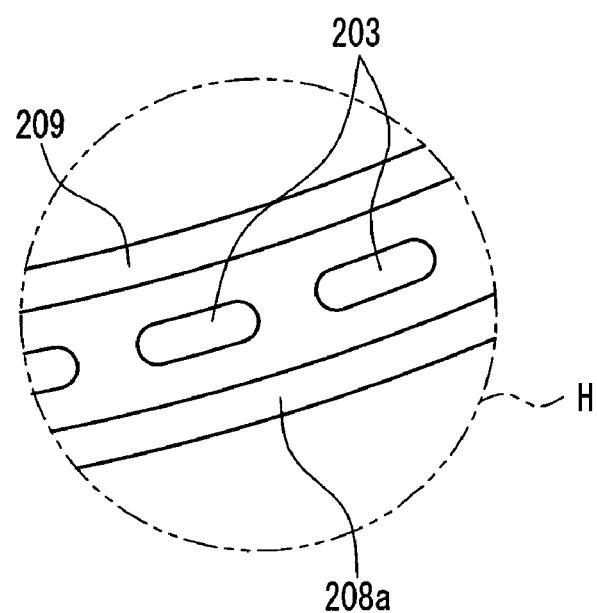
FIG. 24 is an enlarged view of a part H shown in FIG. 23A.

Next, a lens according to Embodiment 8 of the present invention is described, with reference to FIGS. 23A, 23B, and 24. FIG. 23A is a plan view of the lens according to Embodiment 8 of the present invention, as viewed in the optical axis direction. FIG. 23B is a cross-sectional view of the lens shown in FIG. 23A, taken along the line X-X. FIG. 24 is an enlarged view of the part H shown in FIG. 23A.

The fundamental principles for a lens 201 of the present embodiment regarding the shape, the material, the molding method, etc. are identical to those of the lens according to Embodiment 7. The difference of the lens 201 according to the present embodiment from the lens according to Embodiment 7 is as follows: in the vicinity of the inner circumferential wall 208a of the spigot joint part 208, an annular step-like part 209 is formed around the optical axis 202 as the center, so that the annular groove 203 is positioned between the circle corresponding to the inner circumferential wall 208a of the spigot joint part 208 and the annular step-like part 209, as viewed in a plan view.

Therefore, when the lens 201 is set on a microscope or the like and parallel light is projected in the direction along the optical axis 202 in the same manner as that of Embodiment 7, one circle corresponding to the annular groove 203 associated with the accuracy of the lens surface R1, and two circles corresponding to the inner circumferential wall 208a of the spigot joint part 208 and the annular step-like part 209, which are associated with the accuracy of the lens surface R2 (three circles in total) are observed, as shown in FIG. 23A. The two circles corresponding to the inner circumferential wall 208a of the spigot joint part 208 and the annular step-like part 209 are concentric circles around the optical axis 202 as the center, and the circle corresponding to the annular groove 203 is positioned between the foregoing two circles. In one example, the annular groove 203 has a diameter of Φ2.50 mm, the inner circumferential wall 208a of the spigot joint part 208 has a diameter of Φ2.51 mm, and the annular step-like part 209 has a diameter of Φ2.49 mm. Therefore, when there is no eccentricity, the annular step-like part 209, the annular groove 203, and the inner circumferential wall 208a of the spigot joint part 208 are arranged in the stated order from the inside to the outside at pitches of 5 μm at certain positions in the circumferential direction. When eccentricity occurs, the spacing between the annular step-like part 209 and the inner circumferential wall 208a of the spigot joint part 208 does not change, but the position of the annular groove 203 positioned therebetween shifts inward or outward.

As shown in FIG. 24, which is an enlarged view of the part H shown in FIG. 23A, the annular groove 203 is formed as, not a continuous groove, but a groove discontinuous in the circumferential direction, like a broken line. This configuration facilitates the distinction of the circle corresponding to the annular groove 203 from the circles corresponding to the inner circumferential wall 208a of the spigot joint part 208 and the annular step-like part 209, as viewed in a plan view. The annular groove 203 of course may be formed as a continuous groove, or as a discontinuous groove in another form such as an alternate long and short dashed line.

Figure 25A:
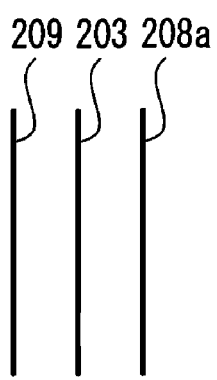
FIGS. 25A to 25D explain the visibility in relation with the accuracy of the lens according to Embodiment 8 of the present invention.
Figure 25B:
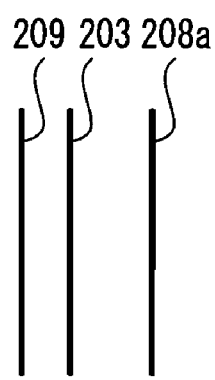

FIGS. 25A to 25D explain the visibility in relation to the accuracy of the lens according to Embodiment 8 of the present invention. FIGS. 25A and 25B schematically illustrate parts in the circumferential direction of the three circles (corresponding to the annular step-like part 209, the annular groove 203, and the inner circumferential wall 208a of the spigot joint part 208), which are observed with regard to the lens 201 according to the present embodiment. In the state shown in FIG. 25A, the annular groove 203 is positioned just at the midpoint between the annular step-like part 209 and the inner circumferential wall 208a of the spigot joint part 208. This state indicates that no eccentricity has occurred between the two lens surfaces R1 and R2. In the state shown in FIG.

25B, it can be viewed easily that the annular groove 203 shifts slightly leftward (inward) with respect to the midpoint between the annular step-like part 209 and the inner circumferential wall 208a of the spigot joint part 208. This state indicates that eccentricity has occurred between the two lens surfaces R1 and R2.

Figure 25C:
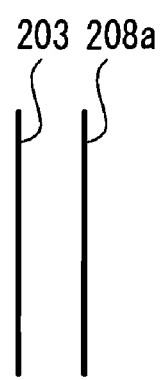
Figure 25D:
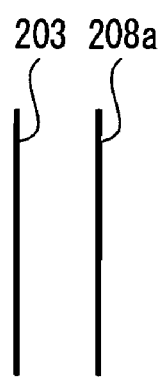

FIGS. 25C and 25D are comparative views that show the cases where the presence or absence of eccentricity is checked only with the two circles, as is the case with Embodiment 7. In other words, this is the state in which there is no annular step-like part 209, and the presence or absence of eccentricity is checked with use of the two circles corresponding to the annular groove 203 and the inner circumferential wall 208a of the spigot joint part 208. FIG. 25C corresponds to FIG. 25A, while FIG. 25D corresponds to FIG. 25B. In the present case, the presence or absence of eccentricity is checked by referring to the spacing, large or small, between the two circles corresponding to the annular groove 203 and the inner circumferential wall 208a of the spigot joint part 208. Clearly, as compared with this checking scheme, the checking scheme in which the three circles 209, 203, and 208a are used as is the case with the present embodiment shown in FIGS. 25A and 25B allows for better visibility, and with this scheme, even a slight eccentricity can be determined visually.

The present embodiment can be varied appropriately so as to be implemented. For example, the annular step-like part may be formed to be close to, not the inner circumferential wall 208a of the spigot joint part 208, but an outer circumferential wall of the spigot joint part 208, and the annular groove 203 may be formed on the opposite surface so as to be positioned between the outer circumferential wall and the annular step-like part, as viewed in a plan view.

Figure 26A:
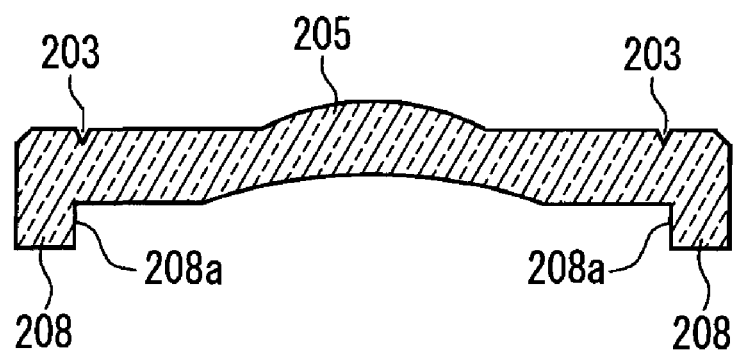
FIGS. 26A to 26C are cross-sectional views of lenses according to modification examples of Embodiments 7 and 8.
Figure 26B:
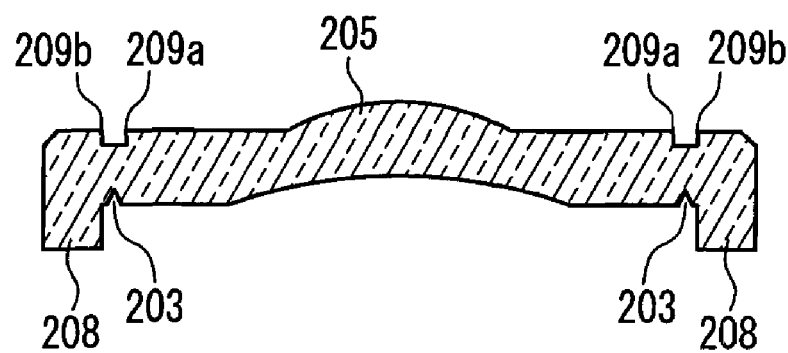
Figure 26C:
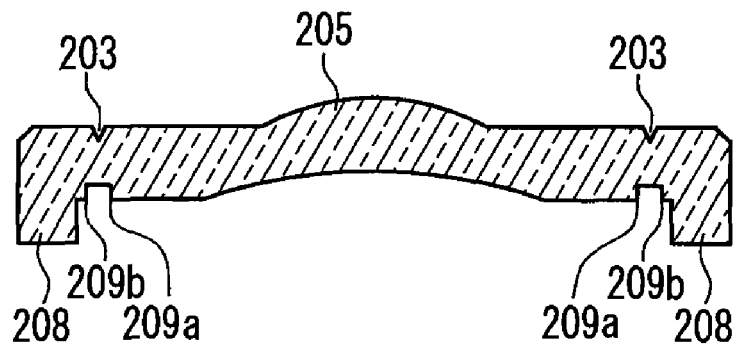

FIGS. 26A to 26C are cross-sectional views illustrating modification examples of Embodiments 7 and 8. In this view, the lens effective part 205 has a convexo-concave lens shape, but it may be a biconvex lens as shown in FIGS. 19A, 19B, 23A, and 23B; the present invention is not limited to these configurations. FIG. 26A shows a modification example of Embodiment 7 in which the annular groove 203 is formed so as to have a diameter smaller than a diameter of the inner circumferential wall 208a of the spigot joint part 208. FIG. 26B shows a modification example of Embodiment 8 in which the annular groove 203 is formed at the inner radius on the surface where the spigot joint part 208 is formed, while two annular step-like parts 209a and 209b are formed on the opposite surface. FIG. 26C shows a modification example of Embodiment 8 in which two annular step-like parts 209a and 209b are formed at the inner radius on the surface where the spigot joint part 208 is formed, while the annular groove 203 is formed on the opposite surface. In each case of FIGS. 26B and 26C, the annular groove 203 is formed so as to be positioned between two circles corresponding to the two annular step-like parts 209a and 209b, as viewed in a plan view. The above-described embodiments and modification examples may be selected, combined, and implemented appropriately according to required accuracy of a lens, constraints in the measurement, constraints in the molding, etc.

Embodiment 9

Figure 27:
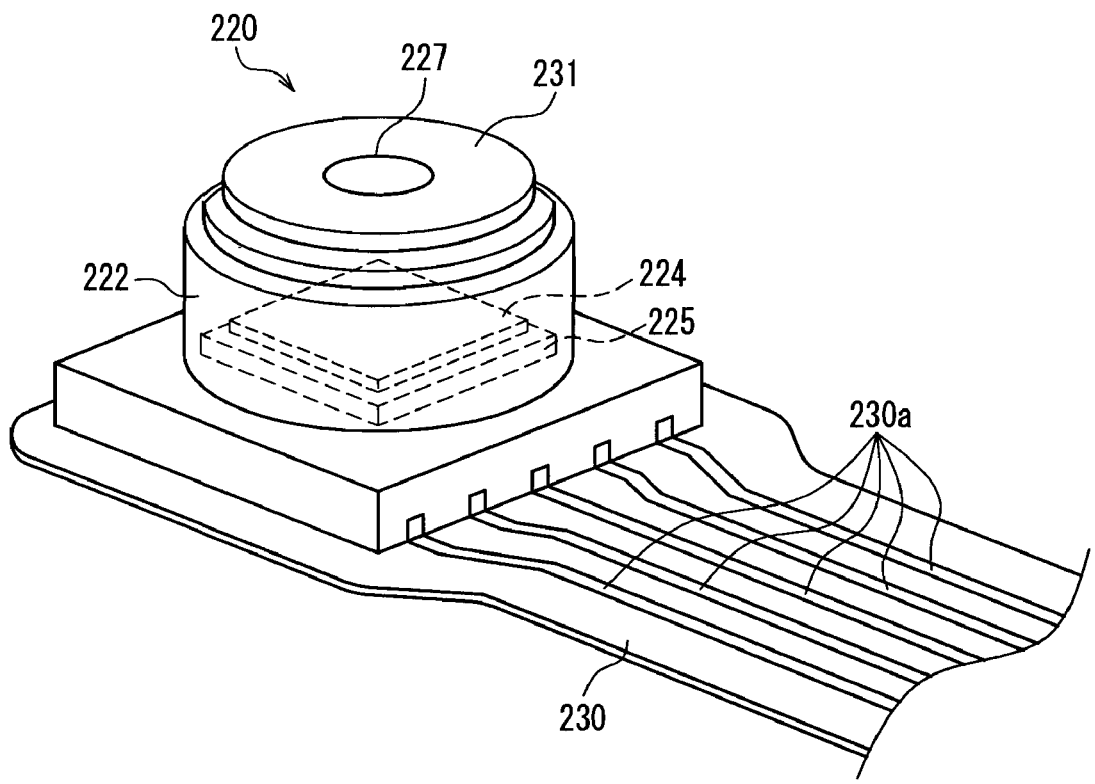
FIG. 27 is a perspective view of an imaging device according to Embodiment 9 of the present invention.
Figure 28:
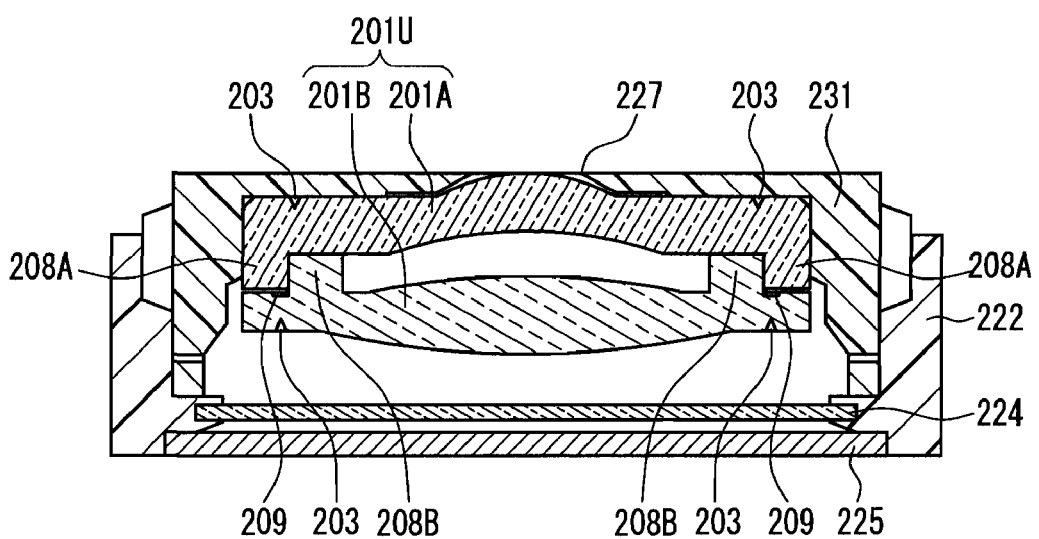
FIG. 28 is a cross-sectional view of a lens barrel part of the imaging device shown in FIG. 27, viewed from a side.

Next, a lens unit configured by coupling two lenses according to Embodiment 7 or 8, and an example of an imaging device in which the lens unit is used are described as Embodiment 9 of the present invention. FIG. 27 is a perspective view of an imaging device in which the lenses according to Embodiment 7 or 8 are used. This imaging device 220 is a camera module for use in a mobile telephone. FIG. 28 is a cross-sectional view of a lens barrel part of the imaging device shown in FIG. 27, viewed from a side.

The imaging device 220 includes a lens unit 201U obtained by combining two lenses 201A and 201B, a lens barrel 231 for holding the lens unit 201U, an optical filter 224, a semiconductor imaging element 225, a three-dimensional substrate 222 for holding these, a flexible printed circuit board (FPC) 230 connected with the three-dimensional substrate 222 for transmitting/receiving signals to/from the outside, and the like. The three-dimensional substrate 222 serves also as a holding member for holding the lens barrel 231, the semiconductor imaging element 225, and the optical filter 224. The lens unit 201U is fixed in a manner such that an outer circumferential face and a top face of the upper lens 201A configuring the lens unit 201U are fitted in an inner circumferential face and a ceiling face of the lens barrel 231. At the center of the ceiling face of the lens barrel 231, an aperture 227 configuring a diaphragm is formed.

The semiconductor imaging element 225 placed below the lens unit 201U is, for example, a ¼-inch CCD having about 1,300,000 pixels and a pixel size of about 2.8 μm. The semiconductor imaging element 225 is connected electrically with a conductive pattern formed on a surface of the three-dimensional substrate 222 by stud bump bonding (SBB). The conductive pattern on the three-dimensional substrate 222 has lead lines drawn out of the three-dimensional substrate 222, which are connected with a conductive pattern 230a of the FPC 230 by soldering. The optical filter 224, placed on the semiconductor imaging element 225, serves for suppressing the transmission of light other than light in the visible light range. Light from a subject is focused by the lens 201, and is incident on the semiconductor imaging element 225 via the optical filter 224. The semiconductor imaging element 225 outputs an electric signal according to the incident light, and the electric signals are taken out via the conductive patterns 230a.

Among the two lenses 201A and 201B configuring the lens unit 201U, the upper lens 201A is the lens shown in FIG. 26A as a modification example of Embodiment 7 shown in FIG. 19A. The lower lens 201B is a lens equivalent to a modification example described in Embodiment 8. More specifically, an annular step-like part 209 is formed so as to be close to an outer circumferential wall of a spigot joint part 208B, and an annular groove 203 is formed on the opposite surface so as to be positioned between the outer circumferential wall and the annular step-like part 209 as viewed in a plan view. Then, the two lenses 201A and 201B are coupled in a manner such that an inner circumferential wall of a spigot joint part 208A of the upper lens 201A is fitted to around an outer circumferential wall of the spigot joint part 208B of the lower lens 201B, whereby the lens unit 201U is configured.

Thus, the two lenses 201A and 201B are coupled directly, and the positioning of them in the axial direction and the diameter direction is carried out by the fitting of the spigot joint parts 208A and 208B. By so doing, the alignment of the optical axes of the two lenses is performed with higher accuracy, as compared with the case where the two lenses are fixed independently in a lens barrel. Besides, as to the lens surface of each lens, the accuracy such that eccentricity is not more than 5 μm can be ensured easily as described above, whereby the stability of quality and the reduction of the number of controlling steps can be achieved. This makes it possible to prevent the resolution from decreasing due to field curvature and the like in peripheral portions of the light-receiving surface of the semiconductor imaging element 225. Further, when this imaging device 220 is used in a mobile telephone with a camera function, an excellent image quality can be obtained in a range from the central part to the peripheral part of an image picked up, which contributes to the increase in the added value of the mobile telephone.

Embodiment 10

Figure 29A:
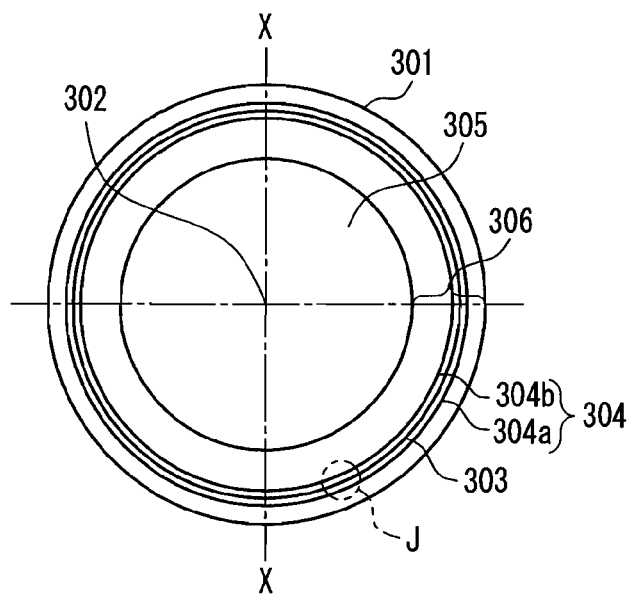
FIGS. 29A and 29B are a plan view and a cross-sectional view, respectively, for schematically illustrating a lens according to Embodiment 10 of the present invention.
Figure 29B:
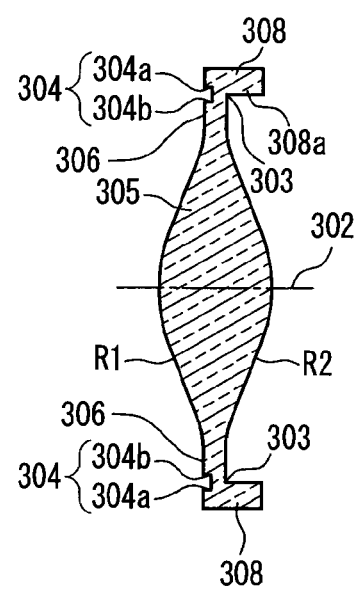

FIGS. 29A and 29B schematically illustrate a lens according to Embodiment 10 of the present invention. FIG. 29A is a plan view of the lens as viewed in the optical axis direction, and FIG. 29B is a cross-sectional view of the lens shown in FIG. 29A, taken along the line X-X. In FIG. 29B, a lens effective part 305 is formed with a left lens surface R1 and a right lens surface R2.

As shown in FIGS. 29A and 29B, a lens 301 of the present embodiment includes a lens effective part 305 in a biconvex lens shape around an optical axis 302 of the lens 301; an edge part 306 in a doughnut shape as viewed in a plan view, which is extended along the outer periphery of the lens effective part 305; and a spigot joint part 308 in an annular shape around the optical axis 302 as the center, which is projected from one surface of the edge part 306 (surface on the lens surface R2 side) as an annular index around the optical axis 302, with which the dimensional accuracy of the lens surface can be detected. This spigot joint part 308 is equivalent to a projected portion in a band-like form as viewed in a plan view. The lens effective part 305, the edge part 306, and the spigot joint part 308 are molded integrally and simultaneously with a resin. As a material of the resin, "ZEONEX" (registered trademark) E48R manufactured by ZEON Corporation, for example, can be used. To obtain required optical properties, the lens effective part 305 is designed so as to become an aspherical lens having an aspherical shape axisymmetric with respect to the optical axis 302. The refractive index, transmittance, and other properties of the material are selected appropriately according to the required optical properties of the lens 301.

It should be noted that though in the present embodiment the lens 301 is produced by resin molding, it is possible to apply the present invention to a lens produced by glass molding using optical glass, or a hybrid-type lens obtained by forming a resin layer on a spherical glass. Further, on at least a surface of the lens effective part 305, about one to four thin films of magnesium fluoride ($MgF_2$), silicon dioxide ($SiO_2$), etc., having different refractive indices, respectively, are formed by vapor deposition as an anti-reflection (AR) coating for preventing reflection.

As will be described later, a lens unit obtained by coupling two lenses having slightly different shapes is incorporated in a lens barrel part in an imaging device according to Embodiment 12, whereby a predetermined image forming optical system is formed. In other words, an image forming system is configured so that light incident on the lens effective part 305 is focused on a predetermined position (on a light-receiving surface of a solid-state imaging element). Here, the edge part 306 and the spigot joint part 308 of the lens 301 have a function as a fitting part upon the coupling of two lenses, as well as a function of positioning and fixing the lens unit with respect to the lens barrel. Both surfaces of the edge part 306 (surfaces perpendicular to the optical axis) are formed so as to be two smooth and flat surfaces parallel with each other.

At a base of the spigot joint part 308 equivalent to a projected portion in a band-like form as viewed in a plan view, which is formed on the edge part 306, an annular angled portion 303 is formed by a side face of the spigot joint part 308 and a surface of the edge part 306. On the other surface of the edge part 306 (a surface on the lens surface R1 side), a recessed part 304 is formed, which is in an annular band-like form as viewed in a plan view, and an angled portion 304a at an outer radius and an angled portion 304b at an inner radius are formed by the bottom face and the side faces of the recessed part 304. The recessed part 304 is formed at the same time when the lens effective part 305, the edge part 306, and the spigot joint part 308 are formed. In the present embodiment, the angled portion 303 formed by the base of the spigot joint part 308 is positioned between the angled portion 304a at an outer radius and the angled portion 304b at an inner radius formed by the recessed part 304. These annular angled portions 303, 304a, and 304b have a function of facilitating the checking of eccentricity and the like of the lens surfaces R1 and R2 of the lens 301. In the machining of dies, in order that the accuracy for the angled portions 303, 304a, and 304b corresponding to the surfaces R1 and R2 of the lens effective part 305 is improved sufficiently, portions of the die corresponding to the same are machined simultaneously. Before the function thereof is described, the resin molding for forming the lens 301 is described below.

The lens 301 is molded in the same process as the injection molding used for producing a usual resin product, whereas a higher dimensional accuracy is required as compared with the usual resin product, and it is necessary to reduce the contamination with dust or the like as much as possible. Therefore, the molding machine is placed in an air-conditioned clean room, and the temperature control of the molding machine is performed accurately. For example, it is necessary to maintain the cleanness class to about 10,000. It is known that in the resin molding, the size and the like subtly vary with the molding pressure, the injection rate, the holding time, the die temperature, the ambient temperature, etc., and hence, it is necessary to monitor the dimensional accuracy of the molded lens 301.

In evaluating the accuracy of the molded lens, in the case of an aspherical lens, it is necessary to perform shape measurement using the above-described AFM (e.g. UA3P manufactured by Matsushita Electric Industrial Co., Ltd.). This measurement is a complicated operation carried out for each molding lot, or at the timings of the start, midpoint, end, or the like for a molding lot. For the purpose of facilitating such a measuring work, the annular angled portions 303, 304a, and 304b formed on the edge part 306 are used. Since the annular angled portions 303, 304a, and 304b, as well as the lens effective part 305, the edge part 306, and the spigot joint part 308 are formed simultaneously, the various kinds of factors that are considered to degrade the accuracy in the molding of the lens 301 (lens effective part 305) also affect the annular angled portions 303, 304a, and 304b formed on the edge part 306. Then, by observing the annular angled portions 303, 304a, and 304b formed on the edge part 306, the eccentricity of each aspheric surface (each face eccentricity) that degrades the resolution of the lens 301 (lens effective part 305), for example, can be evaluated.

The shape of the lens 301 according to the present embodiment is described below. In FIG. 29B, among the lens surfaces forming the lens effective part 305, the lens surface on the left is denoted as R1, while the lens surface on the right is denoted as R2. In one example, the lens surface R1 has a diameter of Φ1.5 mm around the optical axis 302 as the center, while the lens surface R2 has a diameter of Φ1.4 mm. The annular angled portions 303, 304a, and 304b have diameters of Φ2.50 mm, Φ2.51 mm, and Φ2.49 mm, respectively. The edge part 306 has an outer diameter of Φ4.2 mm, and a thickness of about 0.8 mm.

Figure 30A:
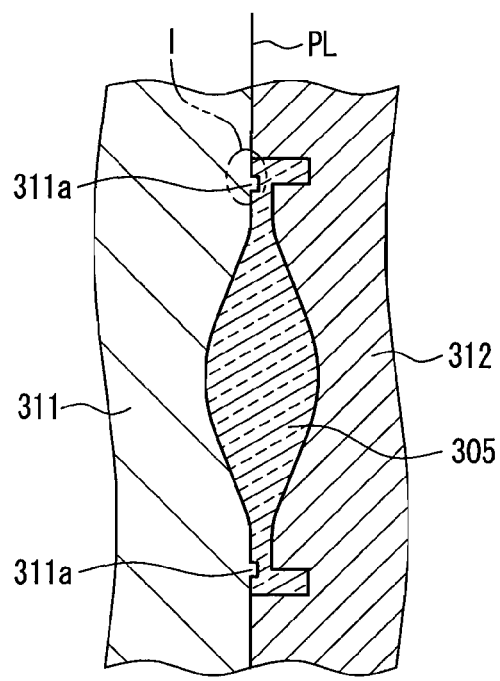
FIG. 30A conceptually illustrates a partial cross section of a die and the lens shown in FIGS. 29A and 29B when the lens is formed by injection molding.
Figure 30B:
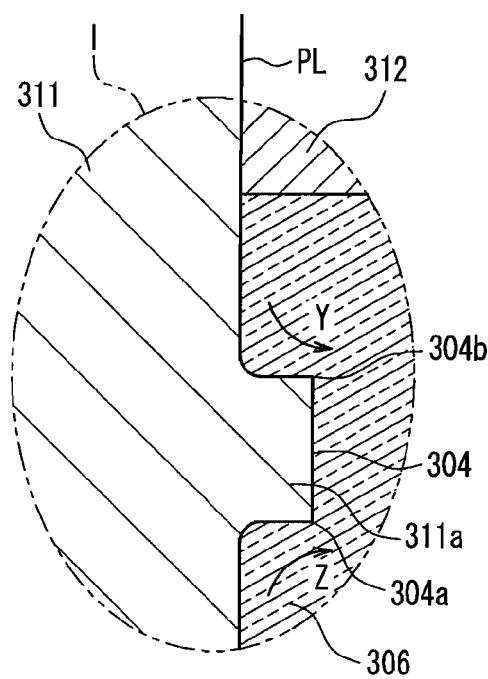
FIG. 30B is an enlarged view of a part of FIG. 30A.

Next, the annular angled portions 303, 304a, and 304b formed in the edge part 306 are described below in detail, with reference to FIGS. 30A and 30B. FIG. 30A conceptually illustrates a partial cross section of a die and the lens shown in FIGS. 29A and 29B when the lens is formed by injection molding. FIG. 30B is an enlarged view of the part I shown in FIG. 30A. The die is made of tool steel, and is attached to a die set of an injection molding machine. As to the die for a lens, a block referred to as an insert part is machined separately, and incorporated into a base. The insert part is produced by machining ultrahigh-strength steel or tool steel into a rough shape, and then plating surfaces of the same with a material having a high hardness such as Ni. The plated portions further are subjected to precision machining using a precision lathe or the like.

In FIGS. 30A and 30B, PL indicates a parting line (parting plane) of the die. On a die 311 on the left, a recessed surface for molding the lens surface R1 of the lens effective part 305, and an annular projected part 311*a* corresponding to the annular recessed part 304 (the angled portions 304*a* and 304*b*) to be formed in the edge part 306 are formed. On a die 312 on the right, a recessed surface is formed for molding the lens surface R2 of the lens effective part 305, and a step-like recess is formed for forming the edge part 306 and the spigot joint part 308. Resin injected through a gate (not shown) is filled in a space enclosed by the left die 311 and the right die 312, whereby the molding is performed.

FIG. 30B shows an enlarged cross-sectional shape of the annular projected part 311*a*. More specifically, the annular projected part 311*a*, which projects rightward from a plane of the left die 311 corresponding to the parting line, has an approximately rectangular cross section. In one example, the approximately rectangular cross section has longer sides of 10 μm each (half the difference between the diameter Φ2.51 mm of the angled portion 304*a* and the diameter Φ2.49 mm of the angled portion 304*b*), and a height of about 8 μm. The right-angled shape of a top face portion of the projected part 311*a* provided on the die 311 is transferred to the edge part 306 of the lens 301, whereby the recessed part 304 having the right-angled portions 304*a* and 304*b* is formed. With regard to the angled portion 303 formed on the other surface of the edge part 306 with use of the die 312, the portion is formed to have right angles in the same manner. In other words, it is important that the angled portions 303, 304*a*, and 304*b* formed on both the surfaces of the edge part 306 of the lens 301 are formed as right-angled edges that are substantially non-rounded in the cross-sectional shapes thereof.

It should be noted that in the case where the lens is made of glass, a material in a ball shape or a disk shape is placed in a die and is softened by high-temperature heating, whereby a required shape is transferred. The basic concepts in this case are identical to those in the case of resin molding, though being different in the steps and the die configuration.

Figure 31:
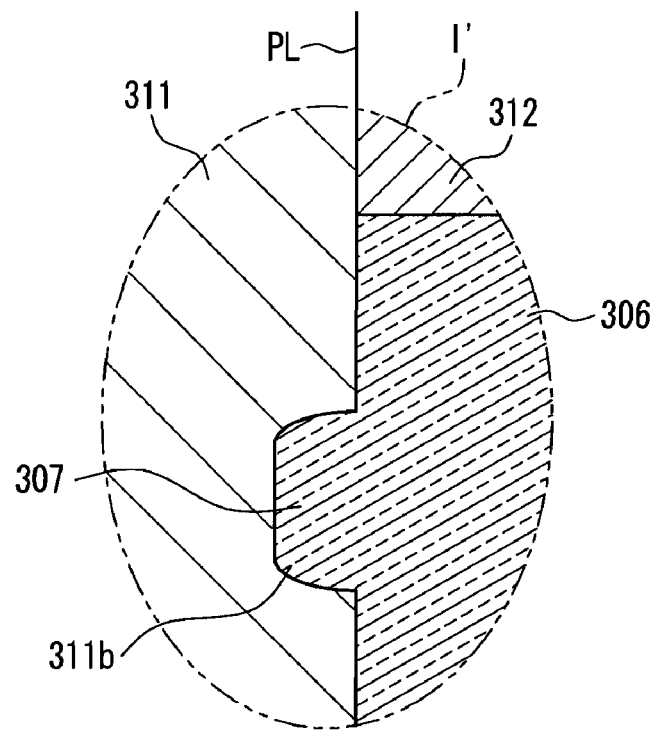
FIG. 31 is a drawing corresponding to FIG. 30B on the assumption that an annular projected portion is formed in the edge part of the lens, instead of the annular recessed part.

FIG. 31 is a drawing corresponding to FIG. 30B on the assumption that an annular projected portion (denoted with I') is formed in the edge part of the lens, instead of the annular recessed part. The basic function of the annular recessed part 304 is to facilitate the checking of the dimensional accuracy of the molded lens 301, as described above. In view of this function, it is considered to be feasible to form an annular projected part on the edge part 306 of the lens 301, in place of the annular recessed part 304.

However, as shown in FIG. 31, in the case where an annular projected part 307 is formed on the edge part 306, it is difficult to allow the top face portion of the annular projected part 307 to have right-angled edges. In order to allow the top face portion of the annular projected part 307 to have right-angled edges, it is necessary to form a recessed part 311*b* having substantially non-round, right-angled edges at its bottom in the corresponding die 311, but it is difficult. This is because a tip of a cutting tool used for machining the die unavoidably has a rounded shape having a certain radius (curved shape), as shown in FIG. 4.

FIG. 4 is a perspective view illustrating a shape of a tip part of a cutting tool for machining the die. This cutting tool 14 is a diamond bite having diamond attached to a tip 14*a* thereof. In one example, the radius of the tip (radius of curvature) of the cutting tool 14 is about 2.3 μm. Therefore, as shown in FIG. 31, the bottom edges of the recessed part 311*b* formed in the die 311 have rounded shapes each of which has a radius of about 2.3 μm, and the edges of the top face portion of the annular projected part 307 of the edge part 306, to which the foregoing shapes are transferred, also have rounded shapes each having a radius of about 2.3 μm. In the case where the dimensional accuracy of the lens 301 is measured using the annular projected portion 307 in such a shape having a top face with rounded edges, it is difficult to improve the measurement accuracy.

In contrast, in the lens 301 of the present embodiment, the annular projected portion 311*a*, which is formed on the die 311 so that the annular recessed part 304 is formed on the edge part 306, is allowed to have a top face portion having non-round, right-angled edges. In other words, even if the cutting tool having a tip 14*a* in a round shape as shown in FIG. 4 is used, the machining may be performed by causing the tool to trim slanting surfaces of the annular projected portion 311*a* from the outer radius side and from the inner radius side of the die as indicated by arrow lines Y and Z shown in FIG. 30B, whereby the annular projected portion 311*a* is allowed to have a top face portion having non-round, right-angled edges. As a result, the annular angled portions 304*a* and 304*b* (the recessed part 304) formed on the edge part 306 of the lens 301 can be formed so as to have non-round, right-angled edges. For the same reasons, the annular angled portion 303 formed by the inner circumferential wall 308*a* of the spigot joint part 308 and the surface of the edge part 306 can be rendered a non-round, right-angled edge. With this configuration, the measurement of the dimensional accuracy of the lens 301 with use of the annular angled portions 303, 304*a*, and 304*b* can be performed with good accuracy.

Next, the method for measuring each face eccentricity of the lens 301 with use of the annular angled portions 303, 304*a*, and 304*b* formed on the edge part 306 of the lens 301 is described below. First, the lens 301 is set on a microscope or the like, and parallel light is projected in the direction along the optical axis 302 of the lens 301. Then, three annular rings are observed, which correspond to the annular angled portions 303, 304*a*, and 304*b* provided on the edge part 306, as shown in FIG. 29A. As described above, since the annular angled portions 303, 304*a*, and 304*b* are formed to have substantially non-round, right-angled edges, these three annular rings are observed as clear-cut thin lines. Besides, since both the surfaces of the edge part 306 are flat and smooth surfaces parallel with each other, only slight refraction or scattering occurs with the incident parallel light. Therefore, it is possible to observe the three annular rings corresponding to the annular angled portions 303, 304*a*, and 304*b* with good accuracy.

Further, since a microscope has a small depth of field, it is necessary to pick up two images at different positions in the optical axis direction and synthesize the two images, in order to observe the three annular rings corresponding to the annular angled portions 303, 304*a*, and 304*b* at the same time. As a microscopic system capable of performing such processing, for example, a metallurgical microscope high-depth-of-field image analysis system DF-2 produced by Olympus Corporation is well known. Alternatively, a confocal scanning microscope may be used. A method of observing the lines with use of a projector or the like may be applicable as a simpler observing method. Besides, it is desirable that light having an appropriate wavelength according to the visibility of the three annular rings corresponding to the annular angled portions 303, 304a, and 304b is used as light to be transmitted through the lens 301.

Figure 32:
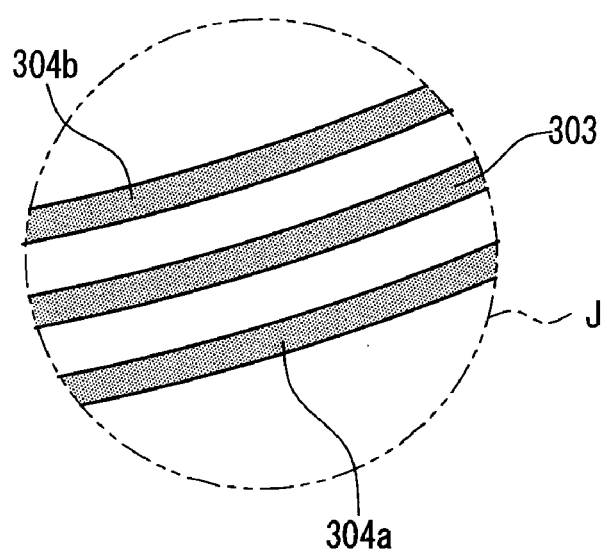
FIG. 32 is an enlarged view of a part J shown in FIG. 29A.

In the case of the lens 301 of the present embodiment, when the three annular rings corresponding to the annular angled portions 303, 304a, and 304b formed on the edge part 306 are observed by a microscope, they are observed as three concentric circles close to one another as shown in FIG. 29A. FIG. 32 is an enlarged view of the part J shown in FIG. 29A. Since the annular angled portions 304a and 304b (the recessed part 304) formed on one surface of the edge part 306 and the surface R1 of the lens are molded simultaneously in the die 311, the annular angled portions 304a and 304b are closely associated with the dimensional accuracy of the surface R1. On the other hand, since the annular angled portion 303 and the surface R2 of the lens are molded simultaneously in the die 312, the annular angled part 303 is closely associated with the dimensional accuracy of the surface R2. Therefore, if the three annular rings corresponding to the annular angled portions 303, 304a, and 304b are observed like concentric circles at constant spacings in the diameter direction, it is assumed that the respective dimensional accuracies of the lens surfaces R1 and R2 are excellent.

As described above, in the lens 301 of the present embodiment, if the annular ring corresponding to the angled portion 303 is positioned between the angled portions 304a and 304b formed on both sides of the recessed part 304, it is estimated that the each face eccentricity with respect to the optical axis is not greater than 5 μm. In other words, since the diameters of the annular angled portions 303, 304a, and 304b are different by 10 μm each, if the centers of the surfaces R1 and R2 are decentered in opposite directions by 5 μm each, the two annular rings are observed as overlapping partially. If the eccentricity is 5 μm or greater, it is possible to detect the eccentricity without failure. The lens 301 of the present embodiment is designed so as to have an eccentricity tolerance of 10 μm, and if there is an eccentricity greater than the foregoing eccentricity tolerance, the eccentricity can be detected sufficiently by observing the annular rings corresponding to the angled portions 303, 304a, and 304b.

If a further greater eccentricity occurs, these annular rings are observed as overlapping at two positions. In the case where such a greater eccentricity is tolerable in view of the lens design, the differences among the diameters of the annular angled portions 303, 304a, and 304b may be set to a greater value. In other words, by setting the difference of these diameters to twice the eccentricity tolerance, the evaluation of the eccentricity between the two lens surfaces R1 and R2 can be performed with good accuracy. In contrast, if the eccentricity tolerance is small, the difference of the diameters of the annular angled portions 303, 304a, and 304b may be set to a smaller value.

Figure 33A:
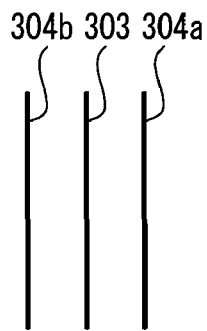
FIGS. 33A to 33D explain the visibility of annular angled portions formed on the edge part of the lens according to Embodiment 10 of the present invention.
Figure 33B:
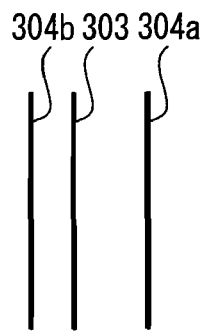

FIGS. 33A to 33D explain the visibility of the annular angled portions formed on the edge part of the lens according to Embodiment 10 of the present invention. FIGS. 33A and 33B schematically illustrate parts of the three annular rings as straight lines, the three annular rings corresponding to the annular angled portions 303, 304a, and 304b formed on the edge part 306 of the lens 301 according to the present embodiment. In the state shown in FIG. 33A, the annular portion 303 on one surface of the edge part 306 is positioned just at the midpoint between the annular angled portions 304a and 304b on the other surface. This state indicates that no eccentricity has occurred between the lens surfaces R1 and R2. In the state shown in FIG. 33B, it can be viewed easily that the angled portion 303 shifts slightly leftward (inward) with respect to the midpoint between the angled portions 304a and 304b. This state indicates that eccentricity has occurred between the two lens surfaces R1 and R2.

Figure 33C:
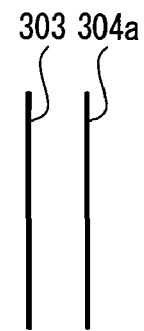
Figure 33D:
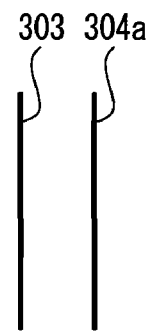

FIGS. 33C and 33D are comparative views that show the cases where the presence or absence of eccentricity is checked only with the annular rings corresponding to the two annular angled portions 303 and 304a. In other words, this is equivalent to the state in which among the angled portions 304a and 304b on one surface of the edge part 306, one of them, i.e., the angled portion 304b is removed, and the other one, i.e., the angled portion 304a remains. FIG. 33C corresponds to FIG. 33A, while FIG. 33D corresponds to FIG. 33B. In the present case, the presence or absence of eccentricity is checked by referring to the spacing, large or small, between the two annular rings corresponding to the angled portions 303 and 304b. Clearly, as compared with this checking scheme, the checking scheme in which the three annular rings corresponding to the three annular angled portions 303, 304a, and 304b are used as is the case with the present embodiment shown in FIGS. 33A and 33B allows for better visibility, and with this scheme, even a slight eccentricity can be determined visually.

Alternatively, by measuring respective degrees of roundness of the annular rings corresponding to the three angled portions 303, 304a, and 304b, the respective dimensional accuracies of the lens surfaces R1 and R2 can be estimated. In this case, charts of perfect circles are prepared in a projector or the like in advance, and differences of projected images of the angled portions 303, 304a, and 304b from the charts may be observed; by so doing, simple evaluation is enabled. If ranges of roundness tolerances are shown in the charts, the evaluation is made even easier. Preferably, the correlation between the roundness degrees of the annular rings corresponding to the angled portions 303, 304a, and 304b and the optical properties of the lens is evaluated in advance. The lenses 301 of the present embodiment were produced under various molding conditions, and optical properties of the lenses were evaluated. Consequently, it was confirmed from the experimental design that if the eccentricity fell in the range of eccentricity tolerance, even without the evaluation of the roundness, the other required shape accuracy and the like could be achieved sufficiently. Therefore, by evaluating the eccentricity of the annular rings corresponding to the angled portions 303, 304a, and 304b, the dimensional accuracy in relation to the required optical properties of the lens 301 can be ensured.

Embodiment 11

Figure 34A:
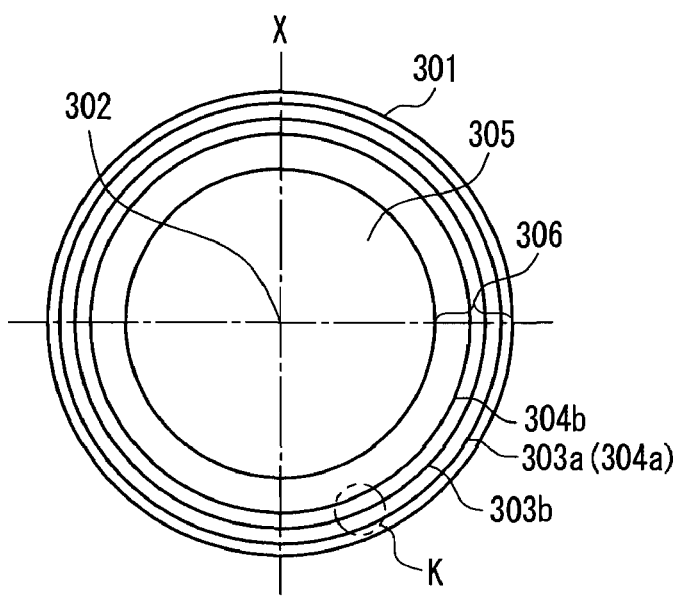
FIGS. 34A and 34B are a plan view and a cross-sectional view, respectively, for schematically illustrating a lens according to Embodiment 11 of the present invention.
Figure 34B:
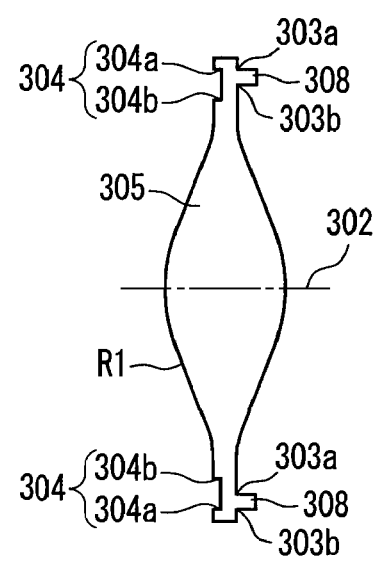

Next, a lens according to Embodiment 11 of the present invention is described below, with reference to FIGS. 34A to 36D. FIGS. 34A and 34B schematically illustrate a lens according to Embodiment 11 of the present invention. FIG. 34A is a plan view of the lens as viewed in the optical axis direction, and FIG. 34B is a cross-sectional view of the lens, taken along the line X-X shown in FIG. 34A. FIG. 35 is an enlarged view of the part K shown in FIGS. 34A and 34B. FIGS. 36A to 36D explain the visibility of an annular angled portion formed on the lens according to Embodiment 11 of the present invention.

The fundamental principles for a lens 301 of the present embodiment regarding the shape, the material, the producing method, etc. are identical to those of the lens according to Embodiment 10. The difference of the lens 301 according to the present embodiment from the lens according to Embodiment 10 is as follows: the spigot joint part 308 is erected toward the axial direction at a position slightly inward with respect to the outer periphery of the edge part 306, whereby not only on the inner radius side of the base of the spigot joint part 308, but also on the outer radius side of the base thereof, angled portions are formed. In other words, as shown in FIGS. 34A and 34B, an angled portion 303a on the outer radius side and an angled portion 303b on the inner radius side are formed on the lens surface R2 side of the edge part 306.

A recessed part 304 formed on the lens surface R1 side of the edge part 306 has a width of twice a width of the spigot joint part 308. An angled portion 304a formed by the bottom surface and the outer radius side surface of the recessed part 304 and an angled portion 303a on the outer radius side of the base of the spigot joint part 308 have the same diameter, so that without eccentricity, they overlap as viewed in a plan view. Besides, an angled portion 303b on the inner radius side of the spigot joint part 308 is positioned between the angled portion 304a on the outer radius side and the angled portion 304b on the inner radius side of the recessed part 304.

Therefore, when the lens 301 is set on a microscope or the like and parallel light is projected in the direction along the optical axis 302 in the same manner as that in Embodiment 10, four annular rings corresponding to the four angled portions 303a, 303b, 304a, and 304b are to be observed, but as described above, without eccentricity, the two annular rings corresponding to the angled portions 303a and 304a overlap, thereby being seen as one. FIG. 36A illustrates this state. FIG. 35 is an enlarged view of the part K shown in FIG. 34A.

In other words, the lens 301 according to the present embodiment is configured so that the presence or absence of eccentricity between the lens surfaces R1 and R2 can be checked, not only by observing whether or not the pitches of the annular rings corresponding to the three angled portions 303a (304a), 303b, and 304b are uniform (whether the annular rings overlap at any position in the circumferential direction) as is the case with Embodiment 10, but also by observing whether or not the annular rings corresponding to the two annular rings 303a and 304a on the outer radius side overlap, thereby being seen as one.

Next, the visibility of the annular angled portions formed on the edge part of the lens according to the present embodiment is described, with reference to FIGS. 36A to 36D. FIGS. 36A to 36D schematically illustrate parts of the annular rings as straight line, the annular rings corresponding to the two annular angled portions 303a and 304a on the outer radius side. FIG. 36A shows a state in which lines of the annular rings corresponding to the two annular angled portions 303a and 304a completely overlap each other; FIG. 36B shows a state in which they overlap while shifting slightly; FIG. 36C shows a state in which they are slightly apart from each other; and FIG. 36D shows a state in which they are apart from each other at a distance at a level of a line width. Thus, the presence or absence of eccentricity, and the level thereof, between the lens surfaces R1 and R2 can be evaluated by evaluating the overlapping or shifting of lines of the annular rings corresponding to the two angled portions 303a and 304a. In other words, the magnitude of the eccentricity can be evaluated more strictly, as compared with Embodiment 10.

It should be noted that Embodiments 10 and 11 as described above can be combined, or appropriately varied, so as to be implemented. FIGS. 37A to 37D illustrate cross-sectional shapes of lenses according to modification examples of the embodiment of the present invention. A lens effective part 305 of each of the lenses shown in FIGS. 37A and 37B has a convexo-concave lens shape; and a lens effective part 305 of each of the lenses shown in FIGS. 37C and 37D has a biconvex lens shape, as is the case with the configurations shown in FIGS. 29A, 29B and 34A, 34B. The shape of the lens effective part 305 is not limited to these in the present invention, and may be any shape.

Figure 37A:
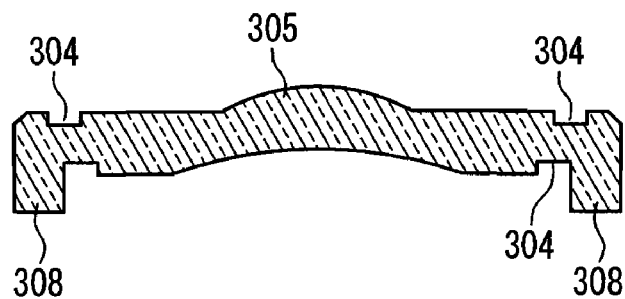
FIGS. 37A to 37D are cross-sectional views of lenses according to modification examples of Embodiments 10 and 11.

In the lens shown in FIG. 37A, an annular recessed part 304 is formed on the inner radius side to a spigot joint part 308 projecting in the axial direction from one surface of the edge part, while an annular recessed part 304 is formed on the other surface thereof. Therefore, annular ring lines correspond to the four angled portions in total. With regard to the positional relationship of these four lines, as is the case with the embodiments described above, they may be arranged so that one formed on one surface is positioned between two formed on the other surface, or that lines on both surfaces overlap.

Figure 37B:
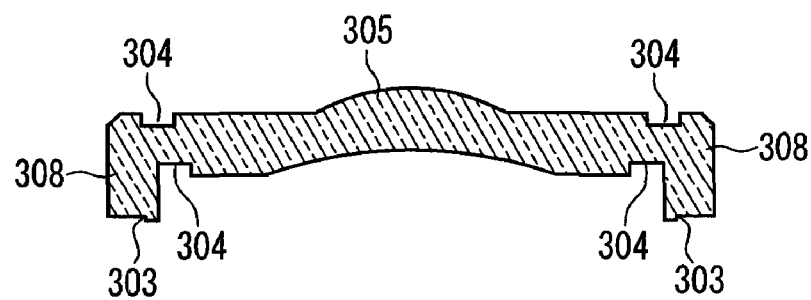

The lens shown in FIG. 37B is a modification of the lens shown in FIG. 37A; the lens is modified by providing a step on the top face of the spigot joint part 308 thereby adding an angled portion 303. The lens shown in FIG. 37C is configured as follows: an annular recessed part 304 is formed on the outer radius side to the spigot joint part 308 formed on one surface of the edge part, and an angled portion 303 is formed on the inner radius side to the spigot joint part 308; a smaller spigot joint part 308' is formed on the other surface of the edge part, an annular recessed part 304 is formed on the inner radius side to the spigot joint part 308', and an annular angled portion 303 is formed on the outer radius side to the spigot joint part 308'.

Figure 37C:
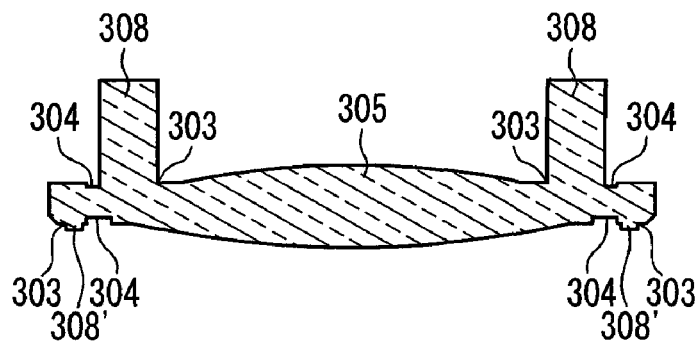

The lens effective part 305 of the lens shown in FIG. 37C is a biconvex lens, and a top face of the spigot joint part 308 formed on the edge part is projected in the optical axis direction, beyond the lens effective part 305. In moving the lens or handling the lens upon installation, for example, when the lens is placed on a flat-face table, the lens may be placed with its spigot joint part 308 side down. By so doing, the top face of the spigot joint part 308 is in contact with the flat-face table, which makes it possible to avoid the lens effective part 305 becoming in contact with the table. Therefore, the surface of the lens is prevented from being damaged. The same is assumed also when the lens is placed in a tray or the like.

When the lens is installed in a lens barrel and the edge part is fixed by bonding, the spigot joint parts (projected parts) 308 and 308' function as dams for preventing the adhesive from intruding toward the lens effective part. Further, the annular recessed parts 304 formed in the vicinity of the spigot joint parts (projected parts) 308 and 308' function as reservoirs for excess adhesive. The annular recessed parts 304 formed on the outer radius side of the spigot joint parts (projected parts) 308 and 308' function as primary adhesive reservoirs, while the annular recessed parts 304 formed on the inner radius side function as ditches for preventing the adhesive flowing over the spigot joint parts (projected parts) 308 and 308' from intruding toward the lens effective part 305. This configuration stabilizes the quality of an assembly of lenses and a lens barrel, and facilitates the control of an applied amount of the adhesive.

Figure 37D:
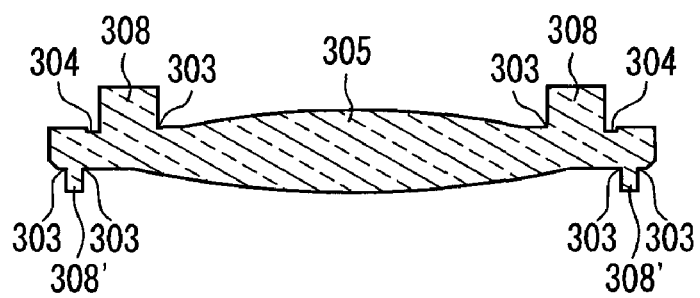

A lens shown in FIG. 37D is a modification of the lens of FIG. 37C. The height (dimension in the optical axis direction) of the spigot joint part (projected part) 308 formed on one surface of the edge part is decreased, and the recessed part 304 on the inner radius side to the spigot joint part (projected part) 308' formed on the other surface is omitted.

The above-described embodiments and modifications can be selected appropriately according to required accuracy of a lens, constraints in the measurement, constraints in the molding, etc., and they may be combined and implemented.

Embodiment 12

Figure 38:
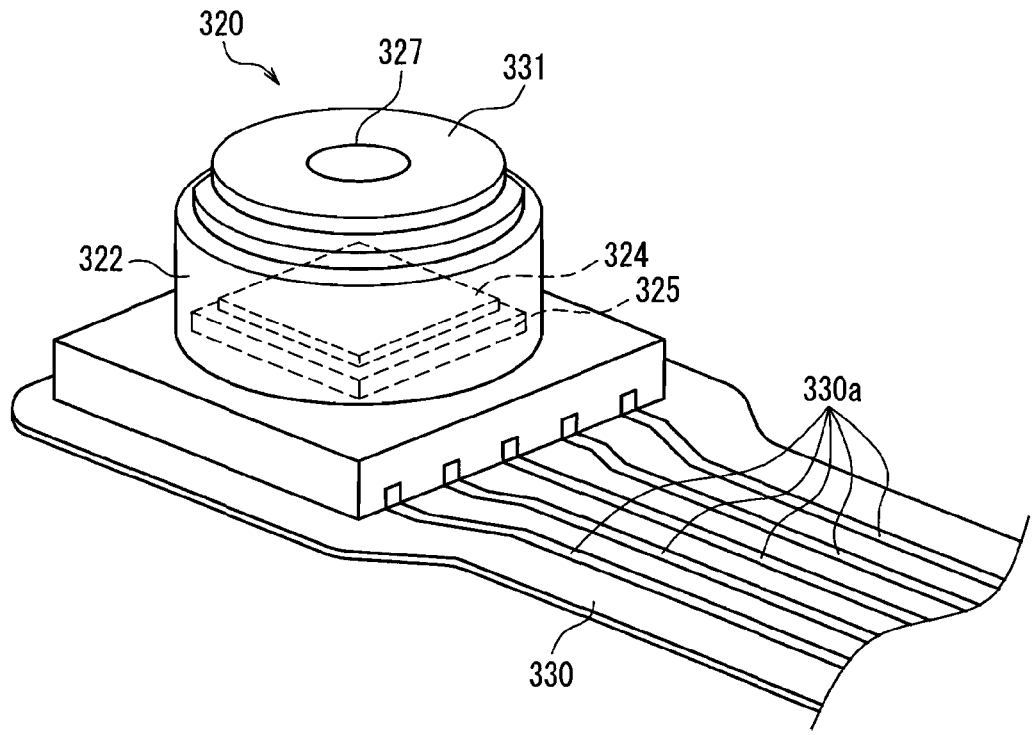
FIG. 38 is a perspective view of an imaging device according to Embodiment 12 of the present invention.
Figure 39:
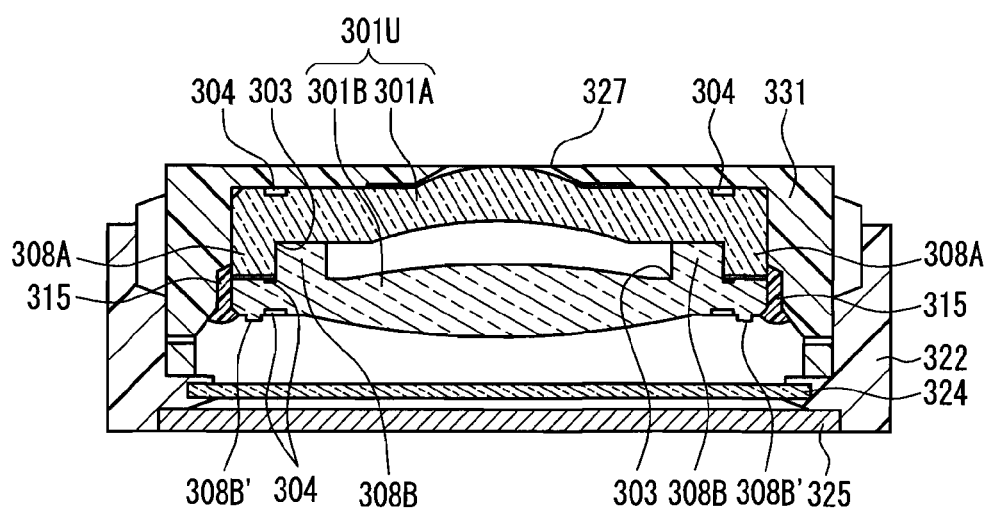
FIG. 39 is a cross-sectional view of a lens barrel part of the imaging device shown in FIG. 38, viewed from a side.

Next, an example of an imaging device in which a lens according to the above-described embodiment or modification is used is described as Embodiment 12 of the present invention. FIG. 38 is a perspective view of an imaging device in which the lens according to Embodiment 10 or 11 is used. This imaging device 320 is a camera module for use in a mobile telephone. FIG. 39 is a cross-sectional view of a lens barrel part of the imaging device shown in FIG. 38, viewed from a side.

The imaging device 320 includes a lens unit 301U obtained by combining two lenses 301A and 301B, a lens barrel 331 for holding the lens unit 301U, an optical filter 324, a semiconductor imaging element 325, a three-dimensional substrate 322 for holding these, a flexible printed circuit board (FPC) 330 connected with the three-dimensional substrate 322 for transmitting/receiving signals to/from the outside, and the like. The three-dimensional substrate 322 serves also as a holding member for holding the lens barrel 331, the semiconductor imaging element 325, and the optical filter 324. The lens unit 301U is fixed in a manner such that an outer circumferential face and a top face of the upper lens 301A configuring the lens unit 201U are fitted in an inner circumferential face and a ceiling face of the lens barrel 331. At the center of the ceiling face of the lens barrel 331, an aperture 327 configuring a diaphragm is formed.

The semiconductor imaging element 325 placed below the lens unit 301U is, for example, a ¼-inch CCD having about 1,300,000 pixels and a pixel size of about 2.8 μm. The semiconductor imaging element 325 is connected electrically with a conductive pattern formed on a surface of the three-dimensional substrate 322 by stud bump bonding (SBB). The conductive pattern on the three-dimensional substrate 322 has lead lines drawn out from the three-dimensional substrate 322, which are connected with a conductive pattern 330a of the FPC 330 by soldering. The optical filter 324, placed on the semiconductor imaging element 325, serves for suppressing the transmission of light other than light in the visible light range. Light from a subject is focused by the lens 301, and is incident on the semiconductor imaging element 325 via the optical filter 324. The semiconductor imaging element 325 outputs an electric signal according to the incident light, and the electric signals are taken out via the conductive patterns 330a.

Among the two lenses 301A and 301B configuring the lens unit 301U, the upper lens 301A is similar to the lens shown in FIG. 37A. The lower lens 301B is similar to the lens shown in FIG. 37C. The two lenses 301A and 301B are coupled in a manner such that an inner circumferential wall of a spigot joint part 308A of the upper lens 301A is fitted to around an outer circumferential wall of a spigot joint part 308B of the lower lens 301B, whereby the lens unit 301U is configured.

Thus, the two lenses 301A and 201B are coupled directly, and the positioning of them in the axial direction and the diameter direction is carried out by the fitting of the spigot joint parts 308A and 308B. By so doing, the alignment of the optical axes of the two lenses is performed with higher accuracy, as compared with the case where the two lenses are fixed independently in a lens barrel. Besides, as to the eccentricity of lens surfaces of each lens, the accuracy such that eccentricity is not more than 5 μm can be ensured easily as described above, whereby the stability of quality and the reduction of the number of controlling steps can be achieved. This makes it possible to prevent the resolution from decreasing due to field curvature and the like in peripheral portions of the light-receiving surface of the semiconductor imaging element 325. The fixing of the two lenses 301A and the 301B is carried out by filling an adhesive 315 between outer circumferential wall surfaces thereof and an inner circumferential wall surface of the lens barrel 331 and curing the adhesive. Here, as described above, an annular projected part 308B' of the lens 301B functions as a dam for preventing excess adhesive 315 from intruding toward the inside (the lens effective part). This configuration stabilizes the quality of a lens assembly, and facilitates the control of an applied amount of the adhesive.

By using the above-described imaging device 320 in a mobile telephone with a camera function, an excellent image quality can be obtained from the center of an picked-up image to peripheries, which contributes to the increase in the added value of the mobile telephone.

The invention claimed is:

1. A lens comprising:
   a lens effective part having lens surfaces formed around an optical axis as the center; and
   an edge part in a doughnut shape as viewed in a plan view, which is extended along an outer periphery of the lens effective part,
   wherein the edge part and the lens effective part are molded simultaneously,
   on both surfaces of the edge part that are a first surface and a second surface, annular indices around the optical axis as the center are formed, with which dimensional accuracies of the lens surfaces can be detected,
   the annular index formed on the first surface and the annular index formed on the second surface have different diameters, and
   eccentricity in excess of an eccentricity tolerance occurring to the lens surfaces can be detected from an overlapping of the indices.

2. The lens according to claim 1, wherein as the annular indices, annular grooves are formed along circles around the optical axis as the center, each of the annular grooves being continuous or discontinuous.

3. The lens according to claim 2, wherein both the surfaces of the edge part are formed so as to be two flat surfaces parallel with each other.

4. The lens according to claim 2, wherein each of the annular grooves is formed so as to have a V-shaped cross section having an acute end.

5. The lens according to claim 1, wherein two annular grooves in a form of concentric circles close to each other around the optical axis as the center are formed on the first surface, while one annular groove around the optical axis as the center is formed on the second surface so as to be positioned between the two annular grooves formed close to each other on the first surface, as viewed in a plan view.

6. The lens according to claim 5, wherein both the surfaces of the edge part are formed so as to be two flat surfaces parallel with each other.

7. The lens according to claim 5, wherein each of the annular grooves is formed so as to have a V-shaped cross section having an acute end.

8. The lens according to claim 5, wherein
   the two annular grooves formed on the first surface are divided into a plurality of segments along the respective circumferential directions at the same angular pitches and phases, the one annular groove formed on the second surface is divided also into a plurality of segments in the circumferential direction, and the segments of the two annular grooves formed on the first surface and the segments of the one annular groove formed on the second surface are arranged alternately in the circumferential direction as viewed in a plan view.

9. The lens according to claim 1, wherein a spigot joint part in an annular shape is provided around the optical axis as the center so as to be projected from the first surface of the edge part, while an annular groove is provided on the second surface around the optical axis as the center, the spigot joint part and the annular groove are molded simultaneously and integrally with the lens effective part and the edge part, and an annular step-like part is formed around the optical axis as the center in the vicinity of either the inner circumferential wall or the outer circumferential wall of the spigot joint part, so that the annular groove is positioned between either the inner circumferential wall or the outer circumferential wall of the spigot joint part and the annular step-like part, as viewed in a plan view.

10. A lens unit, obtained by coupling two lenses according to claim 9 in the optical axis direction, the two lenses being a first lens and a second lens, wherein the two lenses are coupled in a manner such that an inner circumferential wall of the spigot joint part of the first lens is fitted around an outer circumferential wall of the spigot joint part of the second lens.

11. The lens according to claim 1, wherein angled portions are formed on both the surfaces of the edge part, the angled portions being annular around the optical axis as the center as viewed in a plan view, the angled portions are molded integrally and simultaneously with the lens effective part and the edge part, and a recessed part is formed on at least one of the surfaces of the edge part, the recessed part being in an annular band-like form as viewed in a plan view, and a corner formed by a bottom face and a side face of the recessed part is equivalent to the angled portion.

12. The lens according to claim 11, wherein a projected part is formed on at least one of the surfaces of the edge part, the projected part being in an annular band-like form as viewed in a plan view, and a corner formed by a side face of the projected part and the surface of the edge part is equivalent to the angled portion.

13. The lens according to claim 12, a top face of the projected part is projected in the optical axis direction, beyond the lens surface.

14. The lens according to claim 12, wherein a recessed part that is in an annular band-like form as viewed in a plan view is formed in the vicinity of the projected part in the annular band-like form as viewed in a plan view.

15. An imaging device comprising:

the lens or the lens unit according to claim 1; and a semiconductor image forming element that outputs electric signals of an image formed by receiving light focused by the lens or the lens unit.

* * * * *